US011429349B1

(12) United States Patent
Oklobdzija et al.

(10) Patent No.: US 11,429,349 B1
(45) Date of Patent: *Aug. 30, 2022

(54) FLOATING POINT MULTIPLY-ADD, ACCUMULATE UNIT WITH CARRY-SAVE ACCUMULATOR

(71) Applicant: SambaNova Systems, Inc., Palo Alto, CA (US)

(72) Inventors: Vojin G. Oklobdzija, Berkeley, CA (US); Matthew M. Kim, Frankston South (AU)

(73) Assignee: SambaNova Systems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/397,241

(22) Filed: Aug. 9, 2021

Related U.S. Application Data

(60) Provisional application No. 63/190,749, filed on May 19, 2021, provisional application No. 63/174,460, filed on Apr. 13, 2021, provisional application No. 63/166,221, filed on Mar. 25, 2021, provisional application No. 61/165,073, filed on Mar. 23, 2021.

(51) Int. Cl.
*G06F 7/544* (2006.01)
*G06F 7/48* (2006.01)
*G06F 7/483* (2006.01)

(52) U.S. Cl.
CPC .......... *G06F 7/5443* (2013.01); *G06F 7/483* (2013.01); *G06F 7/4824* (2013.01)

(58) Field of Classification Search
CPC ....... G06F 7/4824; G06F 7/483; G06F 7/5443
See application file for complete search history.

(56) References Cited

U.S. PATENT DOCUMENTS 6,904,446 B2 * 6/2005 Dibrino ................. G06F 7/5443
708/501
6,947,962 B2 9/2005 Hoskote
(Continued)

FOREIGN PATENT DOCUMENTS

WO 2010142987 A1 12/2010

OTHER PUBLICATIONS

Bewick, Gary W., "Fast Multiplication: Algorithms and Implementation," Doctoral Dissertation, Feb. 1994, 170 pages.
(Continued)

*Primary Examiner* — Michael D. Yaary
(74) *Attorney, Agent, or Firm* — Haynes Beffel & Wolfeld LLP; Sikander M. Khan; Bruce Young

(57) ABSTRACT

Floating point Multiply-Add, Accumulate Unit, supporting BF16 format for Multiply-Accumulate operations, and FP32 Single-Precision Addition complying with the IEEE 754 Standard. The Multiply-Accumulate unit uses higher radix and longer internal 2's complement significand representation to facilitate precision as well as comparison and operation with negative numbers. The addition is performed using Carry-Save format to avoid long carry propagation and speed up the operation. Operations including overflow detection, zero detection and sign extension are adopted for 2s complement and Carry-Save format. Handling of Overflow and Sign Extension allows for fast operation relatively independent on the size of the accumulator.

22 Claims, 18 Drawing Sheets

(56) References Cited

U.S. PATENT DOCUMENTS

| | | | |
|---|---|---|---|
| 6,988,119 | B2 | 1/2006 | Hoskote et al. |
| 7,024,439 | B2 | 4/2006 | Hoskote |
| 8,037,119 | B1 | 10/2011 | Oberman et al. |
| 8,301,681 | B1 | 10/2012 | Lee et al. |
| 2002/0002573 | A1* | 1/2002 | Landers ............... G06F 9/3885 708/503 |
| 2004/0128338 | A1 | 7/2004 | Even et al. |
| 2014/0208078 | A1 | 7/2014 | Bradbury et al. |
| 2016/0126975 | A1 | 5/2016 | Lutz et al. |

OTHER PUBLICATIONS

Chandrakala, et al., "Design and Implementation of 4-2 Compressor Design with New Xor-Xnor," Int'l Advanced Research J. in Sci., Engineering and Technology IARJSEI, vol. 3, issue 7, Jul. 2016, 4 pages.

Dadda, "Some schemes for parallel multipliers," Alta Fre—quenza, vol. 34, Mar. 1965, pp. 349-356.

Oklobdzija, et al., "A Method for Speed Optimized Partial Product Reduction and Generation of Fast Parallel Multipliers Using an Algorithmic Approach," IEEE Transactions on Computers, vol. 45, No. 3, Mar. 1996, pp. 294-306.

Vangal et al. "A 6.2-GFlops Floating-Point Multiply-Accumulator With Conditional Normalization," in IEEE Journal of Solid-State Circuits, vol. 41, No. 10, Oct. 2006, pp. 2314-2323.

Vangal et al., "An 80-Tile Sub-100-W TeraFLOPS Processor in 65-nm CMOS," in IEEE Journal of Solid-State Circuits, vol. 43, No. 1, Jan. 2008, pp. 29-41.

Wikipedia, IEEE 754, retrieved on Feb. 11, 2022, 15 pages Retrieved from the internet [URL: https://en.wikipedia.org/wiki/IEEE_754].

IEEE Computer Society, IEEE Standard for Floating-Point Arithmetic, IEEE Std 754—2008, dated Aug. 29, 2008, 70 pages.

Wikipedia, bfloat16 floating-point format, retrieved on Feb. 12, 2022, 5 pages. Retrieved from the internet [URL: https://en.wikipedia.org/wiki/Bfloat16_floating-point_format ].

Intel, BFLOAT16—Hardware Numerics Definition, Whitepaper, dated Nov. 2018, 7 pages.

Cloud TPU, The bfloat16 numerical format, Google Cloud, retrieved on Feb. 14, 2022, 3 pages Retrieved from the nternet[URL: https://cloud.google.com/tpu/docs/bfloat16 ].

U.S. Appl. No. 17/397,241—Office Action dated Feb. 10, 2022, 22 pages.

Podobas et al, A Survey on Coarse-Grained Reconfigurable Architectures From a Performance Perspective, IEEEAccess, vol. 2020.3012084, Jul. 27, 2020, 25 pages.

M. Emani et al., "Accelerating Scientific Applications With SambaNova Reconfigurable Dataflow Architecture," in Computing in Science & Engineering, vol. 23, No. 2, pp. 114-119, Mar. 1-Apr. 2021, doi: 10.1109/MCSE.2021.3057203.

U.S. Appl. No. 17/465,558—Office Action dated Jan. 13, 2022, 13 pages.

U.S. Appl. No. 17/465,558—Response to Office Action dated Jan. 13, 2022, filed Jan. 31, 2022, 9 pages.

U.S. Appl. No. 17/465,558 Notice of Allowance, dated Feb. 25, 2022, 8 pages.

U.S. Appl. No. 17/534,376—Office Action dated Feb. 18, 2022, 10 pages.

U.S. Appl. No. 17/534,376—Response to Office Action dated Feb. 18, 2022, filed Mar. 15, 2022, 10 pages.

U.S. Appl. No. 17/534,376 Notice of Allowance, dated Apr. 13, 2022, 17 pages.

* cited by examiner

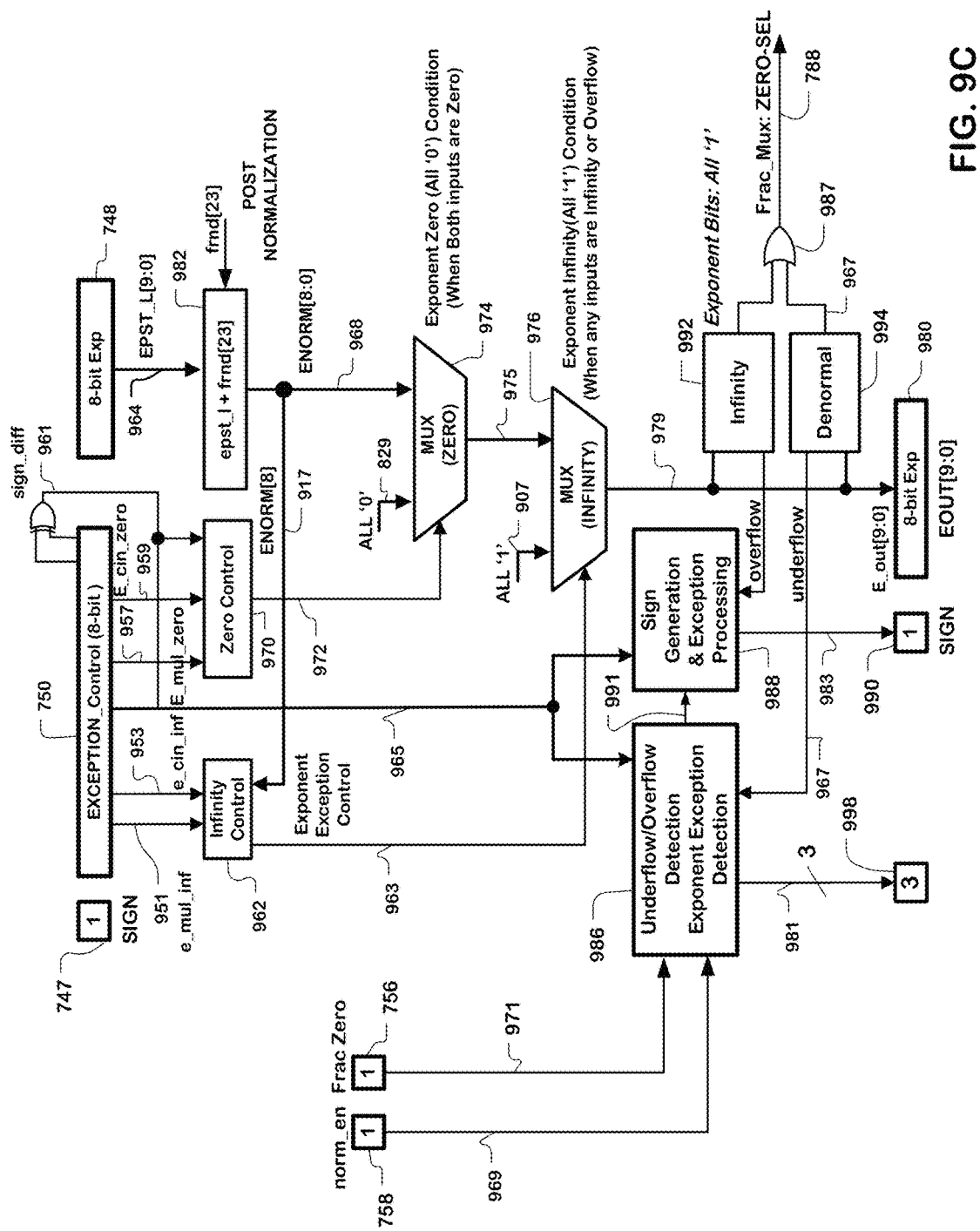

FLOATING POINT MULTIPLY-ADD, ACCUMULATE UNIT WITH CARRY-SAVE ACCUMULATOR

REFERENCE TO PRIORITY APPLICATION

This application claims the benefit of U.S. Provisional Patent Application Nos. 63/190,749 filed 19 May 2021, No. 63/174,460 filed 13 Apr. 2021, No. 63/166,221 filed 25 Mar. 2021, and No. 63/165,073 filed 23 Mar. 2021, which applications are incorporated herein by reference.

FIELD OF THE DISCLOSURE

The field of the disclosure is implementation of arithmetic logic circuits, including floating point, multiply-and-accumulate circuits for high speed processors, including processors configured for efficient execution of training and inference.

BACKGROUND OF THE DISCLOSURE

Arithmetic logic circuits, including floating point, multiply-and-accumulate units, as implemented in high performance processors, are relatively complicated logic circuits. Multiply-and-accumulate circuits are applied for matrix multiplication and other complex mathematical operations, applied in machine learning and inference engines.

Basically, a multiply-and-accumulate circuit generates a summation S(i) of a sequence of terms A(i)*B(i), expressed typically as follows:

$$S(i) = \sum_{i=0}^{N-1} A(i) * B(i)$$

Here, the summation S(i) at cycle (i) is equal to the addition of term A(i)*B(i) to the summation S(i−1) which is the accumulation of terms A(0)*B(0) to A(i−1)*B(i−1). The final summation S(N−1) is a summation output of the multiply- and accumulate operation over N cycles, 0 to N−1.

In a floating point implementation, each cycle multiplies two input floating point operands, A(i) and B(i), including exponent values and significand values to produce multiplier output terms A(i)*B(i), and then computes an accumulator output summation S(i) by adding the multiplier output term A(i)*B(i), of a current cycle with the accumulator output summation S(i−1) of the previous cycle.

In floating point formats used in computing to encode floating point numbers, the numbers can be normalized so that the significand includes a one digit integer (which in binary is always "1") to the left of the binary point, and a fraction represented by a number of bits to the right of the binary point, and the number is encoded using only the fraction. The binary 1 integer is omitted in the encoding, because it can be implied by the normalized form. Operations on the floating point format numbers, encoded in this manner, take into account the integer, referred to as an "implied 1", to the left of the binary point.

Multiplication of floating point numbers can be implemented by adding the exponents, multiplying the significands, and then normalizing the result, by shifting the resulting significand of the output and adjusting the exponent of the output to accommodate the shift.

Addition of floating point numbers can be implemented by first identifying the larger exponent, and the difference between the exponents of the operands, and shifting the significand of the operand with the smallest exponent to align with the larger exponent. Finally, the result is normalized, which can involve an additional shift in the significand and adjustment of the exponent.

The speed of operation of the multiply-and-accumulate unit can be improved by configuring the logic circuits in a pipeline and dividing the logic into discrete circuit units for pipeline stages. Nonetheless, the complexity of the operation can limit the ability to divide the operation up into discrete circuit units for very fast pipeline speeds.

BRIEF DESCRIPTION OF THE DRAWINGS

FIG. 9C illustrates an exemplary schematic diagram showing an Exponent and Exception Handling block.

DETAILED DESCRIPTION

Floating point Carry-Save MAC (FP-CS-MAC)

Figure 1:
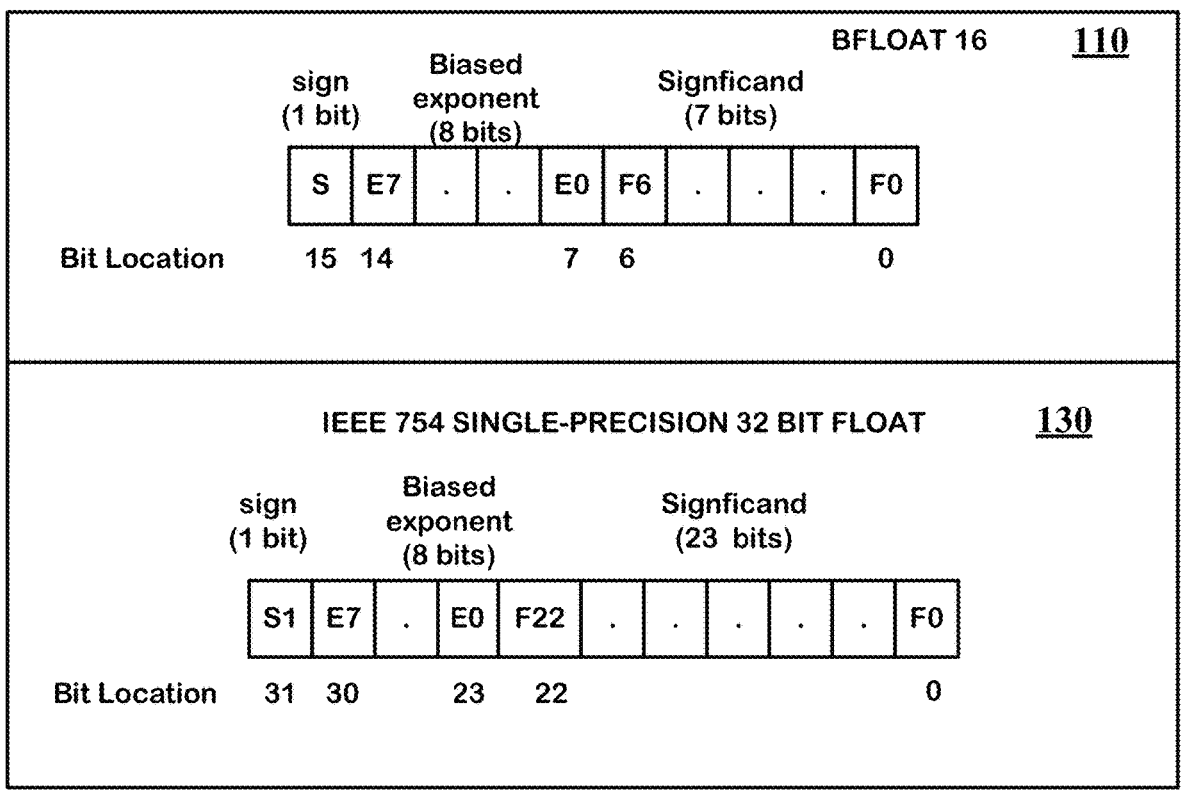
FIG. 1 illustrates encoding formats of a BFloat16 and the Floating-Point IEEE-754 standard.

A FP-CS-MAC is described which can be operated in three operation modes, such as:

Input-A(BF16)×Input-B(BF16)+Accumulation Loop

Input-A(BF16)×Input-B(BF16)+Input-C(FP32)

or a single 32-bit floating point addition such as:

Input-A(FP32)+Input-C(FP32)

Operand A can be in any format, while in this implementation it is either of one of the two formats: BF16 or FP32, where BF16 is a format containing 8-bit exponent, 1-sign bit, 7-bit significand with 1 implied integer bit, for the total of 8 significand bits. FP32 is referred to as Single Precision 32-bit, IEEE Floating-Point 754 standard.

Other encoding formats can be used, and appropriate adjustments of the implementations described can be made.

A three mode Floating point Carry-Save MAC (FP-CS-MAC) unit is described, comprising a circuit implemented as a pipeline, running in response to a pipeline clock. A pipeline clock in some implementations can be on the order of GHz or faster. As the pipeline clock runs, each period of the clock corresponds to a pipeline cycle. Accordingly, a pipeline cycle can be less than a nanosecond in some embodiments. In a pipeline, stages of the pipeline include input registers or data stores that hold stage input data at a first pipeline clock pulse (e.g., a leading edge of a clock pulse), and output registers or data stores that register stage output data of the stage at a next pipeline clock pulse (e.g., a leading edge of the next clock pulse, defining one pipeline clock period). At the time of the first pipeline clock pulse, the output registers of the stage hold the stage output data of the previous pipeline cycle, and the stage output data of one stage in the pipeline is at least part of the stage input data of the next. The circuitry in each stage must settle reliably within the pipeline cycle, and so fast pipeline clocks impose significant difficulties for timing critical stages.

One implementation of a three mode Floating point Carry-Save MAC (FP-CS-MAC) unit comprises 6 pipeline stages. Further increases in speed are possible by increasing the number of pipeline stages. Further decrease in power is possible by reducing the number of pipeline stages. In general, the optimal number of pipeline stages depends on a particular technology and design requirements. A first main unit is the BF16 Multiplier which is implemented in two pipeline stages in this example and includes a conversion unit to convert the multiplier result into a 16-bit 2's complement significand and an exponent. The third pipeline stage is a Carry-Save Accumulate stage. The next two stages convert the result in carry-sum format back into regular normalized sign-magnitude format, such as BF16 or FP32 desired for the output encoding format.

The last pipeline stage performs normalization and rounding to produce results. In this case, the final format is in BF16 or FP32 format. The input operand significands are between $1 \leq |a| Å 2$ as they contain an implied 1 to the left of the decimal point, and include only the fraction part of the significand. The unit does not support denormalized numbers and truncates them to zero. Therefore, using BF16 or FP32, the range of the input operands is $\pm 2^{-126}$ to $(2-2^{-7}) \times 2^{127}$. Numbers outside this range truncate to zero if smaller than $\pm 2^{-126}$ or convert to $\pm$infinity if larger than $\pm(2-2^{-7}) \times 2^{127}$.

Floating Point Formats

FIG. 1 illustrates bit patterns for two encoding formats, A first exemplary diagram of the first bit format illustrates a Bfloat16 110. The Bfloat16 floating point format (sometimes "BF16") is a 16-bit numerical format. BF16 retains an approximate dynamic range of an IEEE single precision number. The illustrated BF16 format includes a 7-bit fraction, an "implied bit" or "hidden bit" to complete the significand, an 8-bit exponent, and one sign bit.

A second diagram illustrates the IEEE 754 single-precision 32-bit floating point (FP32) 130 encoding format. The illustrated IEEE 754 single-precision 32-bit floating point 130 includes a 23-bit fraction, "implied" bit or "hidden bit" to complete the significand, an 8-bit exponent, and one sign bit. A characteristic of these two encoding formats is that the number in FP32 format can be converted to a BF16 format by dropping the 16 less significant bits of the 23-bit fraction, with rounding in some embodiments to select the lower order bit.

System Block Diagram

Figure 2:
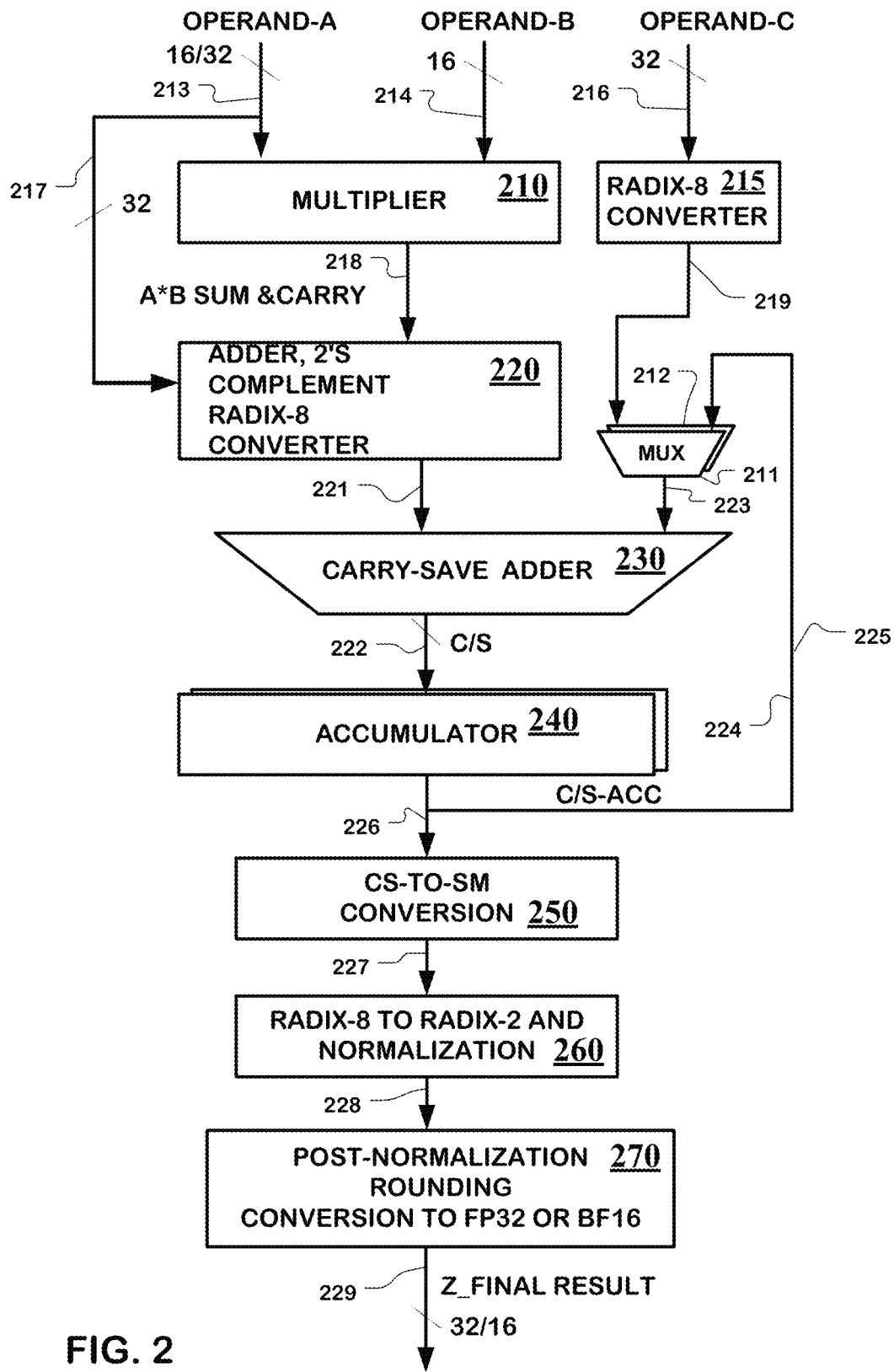
FIG. 2 illustrates a high-level block diagram of the floating point multiply-add, accumulate unit with carry-save accumulator in BF16 and FP32 format.

FIG. 2 is a high-level block diagram of a floating point multiply-add, accumulate unit with carry-save accumulator in BF16 and FP32 format. Operand-A 213 is illustrated as either a BF16 format or a FP32 format 217. Operand-B 214 is a BF16 format and is a first input to the Multiplier circuit 202. The second input is a BF16 Operand-A 213. Operand-A and Operand-B can occupy a single 32-bit register, using 16-bits each, when both Operand-A and Operand-B are in BF16 format, representing multiplier and multiplicand inputs to the multiplier. The product (A*B) output of the Multiplier circuit 210 is produced in the Carry-Sum form on line 218, which is the input to a Final Adder in block 220. Block 220 also converts the result into 2's complement form, and includes Radix-8 Converter circuit to support radix-8 operations.

When the pipeline is operated in a single 32-bit addition, one operand, Operand-A can bypass the Multiplier circuit 202, while the second operand C for the addition, comes from line 216.

Operand-C 216 in this example is a 32-bit operand, and it is input to Radix-8 Converter 215 which outputs a result on line 219 to the first input of one of the Multiplexers 210 and 211. The second inputs to the Multiplexers 210 & 211 are the two buses for the carry and sum values C/S-ACC on lines 224 and 226 (and exponents not shown) fed back from the output of Accumulator 240. The Multiplexers 211 and 212 outputs the exponent and significand as two values the bus 223.

A Carry-Save Adder 230 receives the output of block 220 on line 221, and the output of the multiplexers 211, 212 on twin bus 223. The Carry-Save Adder 230 outputs the exponent and C/S values of the sum on twin bus 222 which enters the Accumulator 240. The Accumulator 240 provides C/S-ACC exponents and significands in carry save form on output buses 224 and 225 which feedback to the Multiplexer 211, Multiplexer 212, and provides the C/S-ACC exponents and significands in carry save form on and bus 226 to the Carry-Save to Sign-Magnitude Conversion block 250, which performs a final add of the carry and sum values of the significand on bus 226, and converts the resulting significand to sign-magnitude format on bus 227.

A Radix-8 to Radix-2 Conversion and Normalization block 260 has an input on bus 227 and outputs normalized results on bus 228 to the Post-Normalization, Rounding, and Conversion to FP32 or BF16 block 270 which converts the output into FP32 or BF16 format 229. The operations output the result "Z" on bus 229 in either 32-bit FP32 format or 16-bit BF16 format.

Thus, FIG. 2 illustrates an example of a circuit which can be implemented as a multistage pipeline configured to execute in three modes, including a multiply-and-accumulate operation for a sequence of input floating point operands. The circuit can be configured as a pipeline in this example including a first stage including a floating point multiplier with sum and carry outputs, a second stage including a multiplier output adder for the sum and carry outputs of the multiplier and circuits to convert the multiplier adder output to radix-8 format with a 2's complement significand, a third stage including a significand circuit and an exponent circuit of an accumulator adder, a fourth stage to convert the accumulator sign bit, an accumulator exponent and accumulator significand sum and carry values to a sign-magnitude significand forma, a fifth stage to convert the sign-magnitude significand format from radix-8 alignment to radix-2 alignment, and produce a normalized exponent and significand, and a sixth stage to perform rounding and conversion to a standard floating point representation.

The technology described herein provides a multiply-and-accumulate method to calculate a summation S(i) of terms A(i)*B(i), where (i) goes from 0 to N−1, and N is the number of terms in the summation. The method can comprise receiving a sequence of operands A(i) and operands B(i) in floating point format, for (i) going from 0 to N−1; multiplying operand A(i) and operand B(i) to generate term A(i)*B(i) in a format including a multiplier output exponent and a multiplier output significand, and converting the multiplier output significand to a 2's complement format; using a carry-save adder to add the 2's complement format significand of term A(i)*B(i) to a significand of summation S(i−1), and generate sum and carry values for summation S(i); selecting an exponent of summation S(i) from the multiplier output exponent of A(i)*B(i) and the exponent of summation S(i−1), to generate exponent of summation S(i); and converting the sum and carry values and the exponent of summation S(i) to a normalized floating point format.

Also, the method can include providing the multiplier output exponent and multiplier output significand of term A(i)*B(i) in a radix-8 format, and generating the sum and carry values and the exponent of summation S(i) in radix-8 format before converting to the normalized floating point format, which can be radix-2.

The alignment required in the accumulate addition stage depends on a number of conditions, including summation S(i−1) significand overflow, summation S(i−1) sign extensions and difference between the exponents of the addends: term A(i)*B(i) and summation S(i−1). These conditions can be determined and combined for use for alignment in a same pipeline cycle (e.g., the third stage in the six stage example), enabling fast execution and faster pipeline clocks.

Floating Point Multiplier

The Floating point Multiplier includes exponent circuits and significand circuits. The Exponent part performs addition of operand exponents, while the significand part performs binary multiplication of the operand significands. The operands entering the multiplier are "normalized" floating point numbers, where the first bit is 1. Therefore, the operand significand (m) is between 1≤m<2, meaning it is greater or equal to 1, and less than 2. As such, the product of the two operand significands is in the range of is 1≤p<4 and can never be equal or greater than 4.

If the product p, which is the result of the significand multiplication, is in a range of 2≤p<4, the exponent will be incremented, and the significand shifted one binary position to the right for normalization.

Figure 4A:
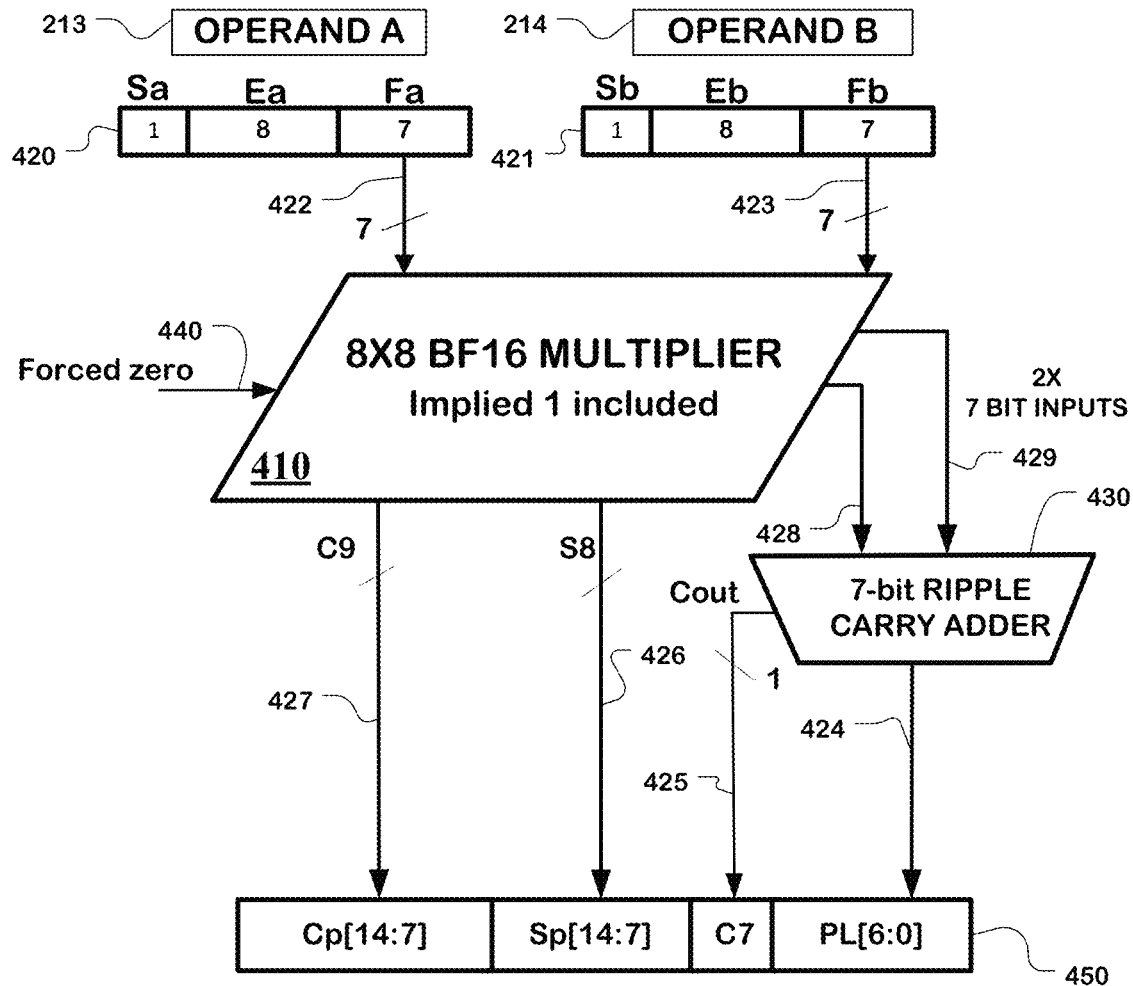
FIG. 4a illustrates an example Multiplier & Adder block comprising an 8×8 Multiplier Partial Product Reduction Tree.

The first pipeline stage performs addition of exponents and multiplication of operand significands using an 8×8-bit integer multiplier including carry-save adders for the partial products. The result from the multiplier array, after summing all the partial products using the carry-save adders, can include two parts: 8-bits of Sum and 9-bits of Carry from carry save adders for the partial products in the most significant portion of the multiplier array, and an 8-bit product from the least significant portion of the multiplier array. Partial products for the 8-bits in the least significant portion are added together in this example using a ripple-carry adder, as the bits arrive from the partial product reduction tree. This summation can be done using a Ripple-Carry Adder, because the time arrival profile from the least significant portion of the multiplier is such that bits arriving in time from the Least Significant Bit (LSB) to the Most Significant Bit (MSB), of that portion, make a ripple-carry adder adequate. Applying a Ripple-Carry Adder (RCA), reduces the complexity of the multiplier significantly. (FIG. 4a)

This stage includes a multiplier circuit to provide multiplier significand and multiplier exponent values prior to the pipeline clock in response to first and second input operands which are registered on the pipeline clock. The multiplier circuit includes a significand multiplier circuit and an exponent adder circuit, the significand multiplier circuit having a carry-save adder for partial products used to generate carry-and-sum values to generate higher order bits of the multiplier output significand and a ripple-carry adder for partial products used to generate lower order bits of the significand carry-and-sum outputs. Also, the multiplier circuit includes a radix-8 conversion circuit to convert the multiplier significand and multiplier exponent values to radix-8 format for the multiplier output exponent and significand; and a 2's complement conversion circuit to convert the multiplier significand value to a 2's complement representation for the multiplier output significand.

The exponents are added separately. Both exponents are positive numbers larger than zero. When the addition result is a number greater than 256, an indication is the carry-out signal from the exponent adder. If the resulting exponent is equal to 255, the positive infinity indication is asserted. If the exponent equals zero, the significand is set to zero, according to the IEEE 754 standard rules. In this implementation and so, if the exponent of the product is 0, the significand of the result is forced 0, thus representing+/− zero floating point number. (FIG. 4b) In other embodiments, sub-normal numbers may be treated differently.

Figure 4B:
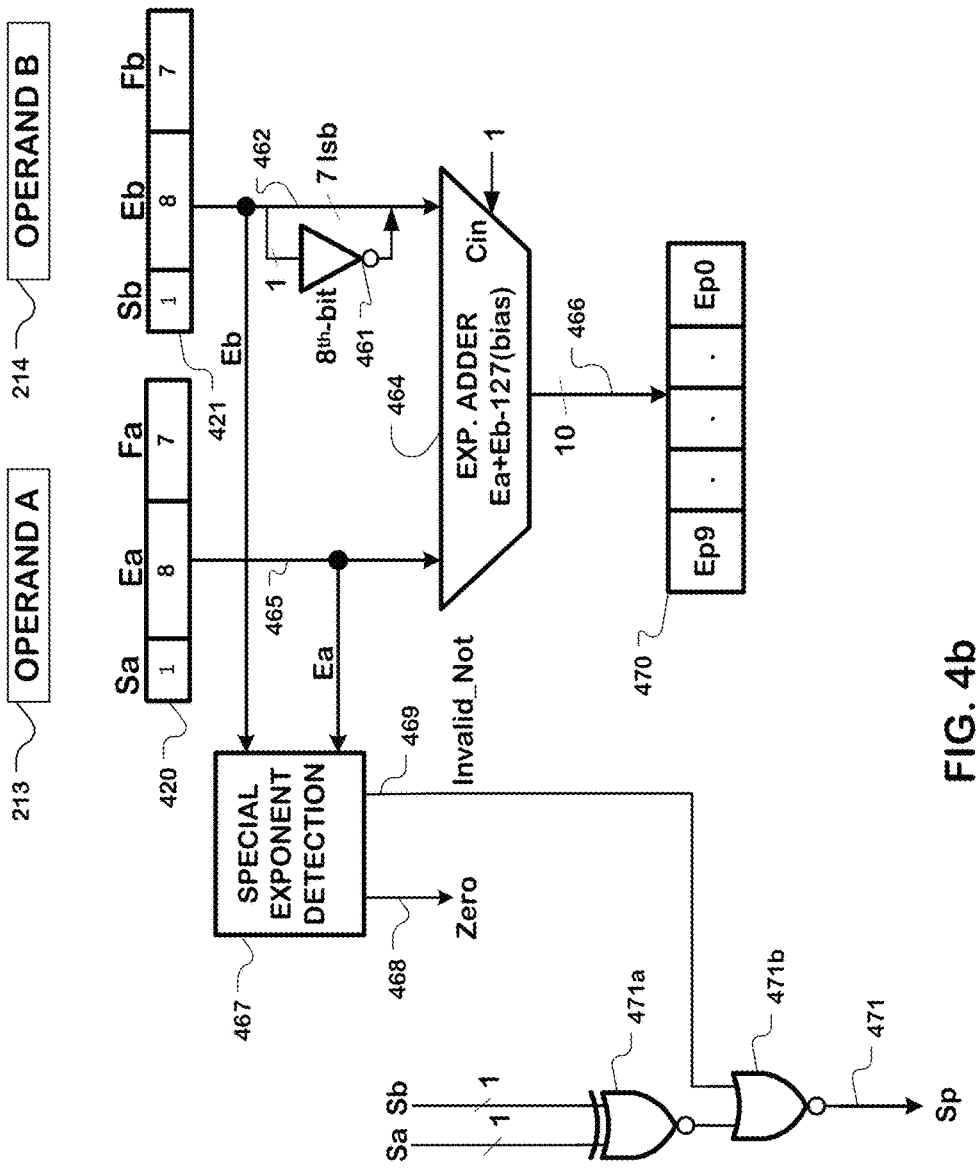
FIG. 4b illustrates an example Exponent Unit with Special Exponent Detection block.

The exponent addition requires subtracting 127 from the result, since both operands contain a 127 bias in the BF16 and FP32 encoding formats. The conversion process is made faster by adding 129 to the result, which is achieved by inverting the MSB of the exponent of one of the inputs and introducing 1 into the carry input of the adder. This greatly simplifies the circuit and can reduce time required for the pipeline stage. (FIG. 4b)

We prove the correctness of this procedure in the following way: the addition results in two biases of 127 being added, making bias to be 254. However, since the carry out of the adder, which amounts to 256, is ignored, the resulting bias will be −2. We can make up to 127 by adding 129 to the result of the operation. This is achieved by inverting the MSB of an operand, which in the case of a negative operand is equivalent to adding 128, as the MSB position contains zero. In the case of a positive operand, where MSB is equal to one, this is also equivalent to adding 128. An additional 1 at the carry input makes the result to be biased by: −2+129, which is equal to the required 127 bias.

The same pipeline stage converts the result into a radix-8 number which contains 5-bit exponent, and a significand appropriately shifted 7 positions to the right. Conversion to 5-bit exponent requires a shift left from the $7^{th}$ position, for the amount represented by the value of the remaining 3 exponent bits. This requires the significand to be passed through a left shifter which will shift the significand from 0 to 7 bit positions to the left as required by the 3-LSB bits of the 8-bit exponent. (FIG. 5b)

A multiplier saves compute time by recognizing that the signal arrival profile originating from a Partial Product Reduction Tree (PPRT) is uneven. The LSB bit arrives first, followed by the next one and so on for the first 8 least significant bits (LSB) of the PPRT. Because of the unequal arrival profile, the addition of the LSB portion can be masked ("hidden") under the delay of the multiplier array, thus providing savings (in terms of time) for a pipeline stage (e.g. the second pipeline stage in the example outlined above. Summing the LSB portion uses an 8-bit Ripple-Carry Adder (RCA) to reduce the size of the Carry-Propagate Adder (CPA) using carry-save adders for the partial products from 17 to 9 bits. The MSB portion used in a next pipeline stage, includes a final adder which is only 9 bits long. The significand of the product is formed in a pipeline stage by adding the most significant 9 bits from the final adder and augmenting it with the least significant 8 bits previously formed in using the ripple carry adder of the preceding pipeline stage. (FIG. 4a)

Figure 3:
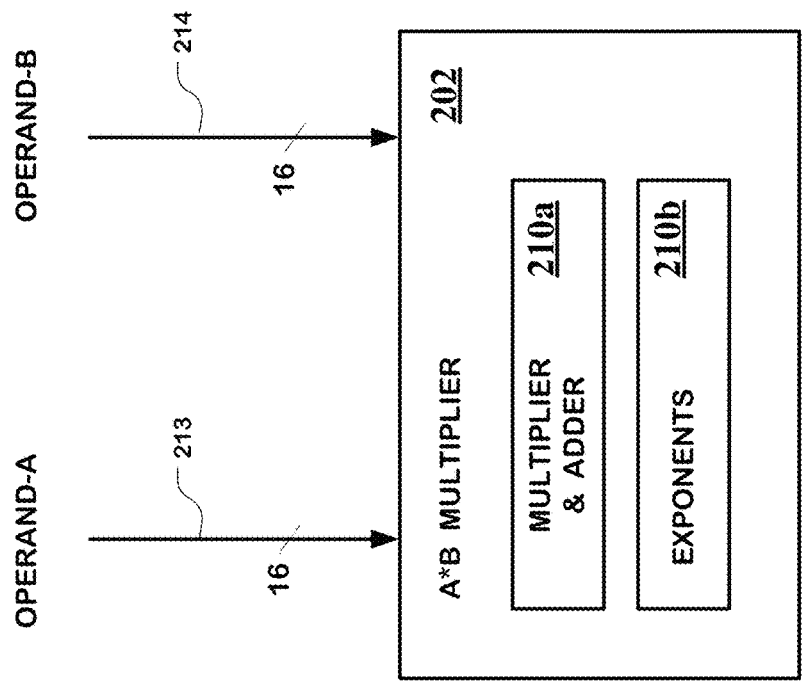
FIG. 3 illustrates a hierarchical block diagram of a Multiplier circuit with two inputs, Operand-A and Operand-B.

FIG. 3 is a simplified block diagram 300 of a Multiplier circuit 202 with two inputs, Operand-A on line 213, and Operand-B on line 214. The Multiplier circuit 202 comprises two blocks, Multiplier & Adder block 210a and the Exponents block 210b.

FIG. 4a illustrates a example of a Multiplier & Adder block 210a, showing an 8×8 Multiplier Partial Product Reduction Tree with carry save adders for partial products of the more significant bits without a Final 16-Bit Adder (provided in the next stage) with a 7-LSB Ripple-Carry Adder block for partial product additions of the less significant bits. Operand-A 213 is stored in a register 420 comprising three fields: Sa, Ea and Fa. Sa is the sign bit. Ea is the eight exponent bits and Fa is the fraction part of the significand. The Fa field is applied on line 422 to a first input to the 8×8 BF16 Multiplier circuit 410. Operand-B 214 is stored in a register 421 comprising three fields: Sb, Eb and Fb. Sb is the sign bit. Eb is the eight exponent bits and Fb is the fraction part of the significand. The Fb field is applied on line 423 to a second input to the 8×8 BF16 Multiplier circuit 410. The input to the multiplier 410 on line 440 is a forced zero bit, which when zero forces 8×8 BF16 Multiplier circuit to produce zero output.

The 8×8 BF16 Multiplier circuit 410 outputs two 7-bit LSB buses, 428 and 429, which are the inputs to a 7-bit Ripple-Carry Adder 430. Also, the 8×8 BF16 Multiplier circuit 410 outputs eight sum bits S8 426, and nine carry bits C9 427. The 7-bit Ripple-Carry Adder 430 outputs 7 bits on line 424 and a carry-out bit COUT on line 425 into register 450. The register 450 has the following mapping: line 424 maps to PL [6:0], COUT on line 425 to C7, S8 on line 426 to Sp [14:7] and C9 on line 427 to Cp [14:6].

FIG. 4b illustrates an example Exponent Unit (e.g. 210b of FIG. 3) with Special Exponent Detection block 467. Operand-A 213 is in register 420 as in FIG. 4a, and Operand-B is in register 421 as in FIG. 4a. Ea on line 465 is one input to a Special Exponent Detection Block and to the Exponents Adder circuit 464. Eb on line 462 is a second input to a Special Exponent Detection Block. The seven least significant bits of Eb on line 462 are input to the Exponents Adder circuit 464 and the 8th-bit, is inverted by inverter 461 before entering the Exponents Adder circuit 464 in the 8th-bit position. A carry in value is set to "1" for the Exponent Adder circuit 464.

The Exponents Adder circuit 464 operates on Ea 465 and Eb 462, adding them together and subtracting the bias value of 127. The output is a 10-bit value 466 to register 470. Two extra bits, beyond the necessary 8 bits for encoding the exponent, are carried to detect an exponent overflow situation. Those 10 bits are further examined in the Exponent Exception Processing circuit 524, shown in FIG. 5C.

The input exponent signals are examined in the Special Exponent Detection block 467 for being Zero as indicated by a signal on line 468, or Invalid as indicated by a signal on line 469. Sign bits Sa and Sb from registers 420 and 421 are input to a XNOR gate 471a, the output of which is applied to XNOR gate 471b. Also, the Invalid signal on line 469 is input to XNOR gate 271b. If Invalid signal is zero, the resulting sign is an XOR function of Sa and Sb. If Invalid is true (equal "1") the product sign Sp is set to "zero", as specified in the encoding standard.

Base-8 Conversion

Figure 5A:
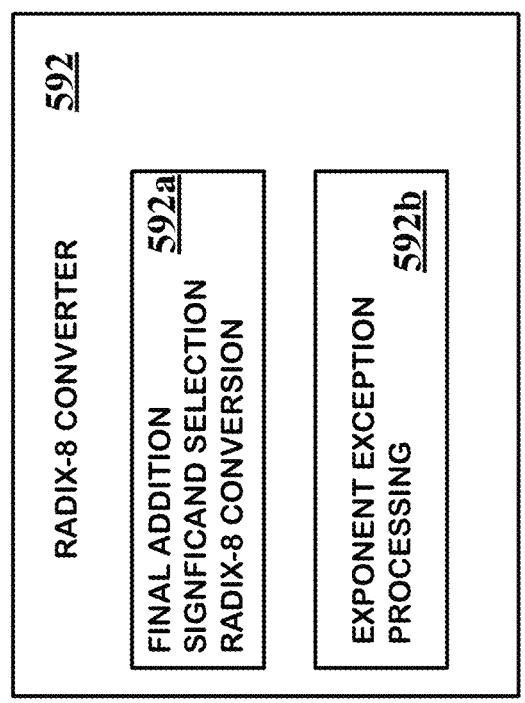
FIG. 5A illustrates a hierarchical block diagram showing a Base-8 Converter comprising an example Final Addition, Significand Selection and Base-8 Conversion block and an example Exponent Exception Processing block.
Figure 5B:
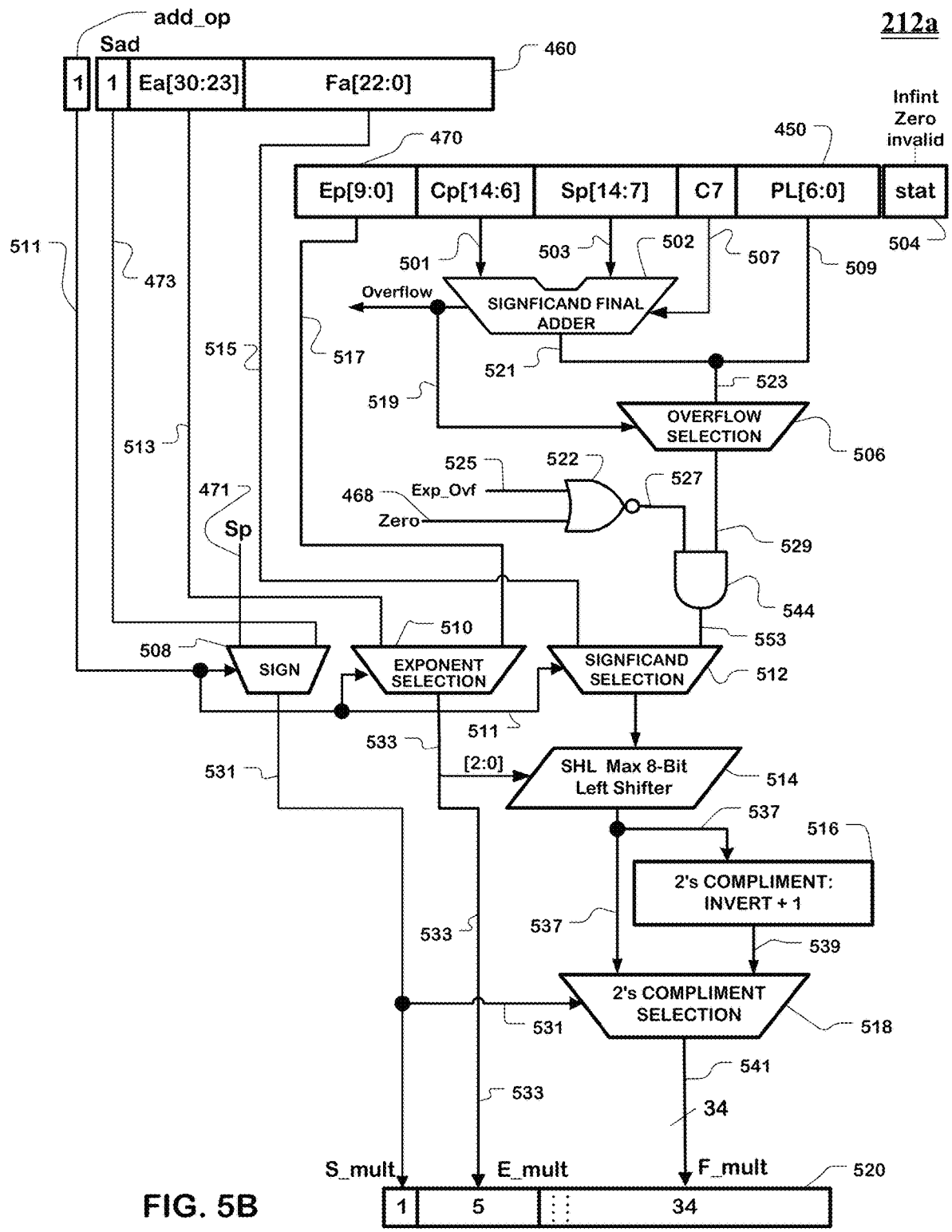
FIG. 5B illustrates an exemplary schematic representation of the final partial product addition, Significand Selection and Base-8 Conversion block.

FIG. 5A is a simplified diagram showing a Radix-8 Converter block 592 (e.g. block 220 of FIG. 2). The Radix Base-8 Converter block 592 comprises two sub-blocks in this example, the Final Addition, Significand Selection and Radix-8 Conversion sub-block 592a and Exponent Exception Processing sub-block 592b.

Conversion to Radix-8, 2's Complement Significand

External input Operand-A is converted to a Radix-8 encoding in the second pipeline stage. The operand A significand is converted into a 2s complement significand. The significand is extended to 34 bits, including two significand sign bits. The resulting pipeline register 520 shown in FIG. 5b, comprises a 5-bit exponent, a 34-bit significand, and two additional status bits for a total of 41 bits.

Conversion to Radix-8 is implemented using the last 3 bits of the exponents to align the 24-bit Operand significand from register 450 of FIG. 4a, into a 32-bit radix-8 significand, where the LSB of the significand aligns with the LSB of the 32-bit significand, if the 3-LSB of the exponent are equal to zero (i.e., shifted 8 positions to the right from the binary point). Any value represented by the 3-LSB of the exponent is the amount for which the significand shifts to the left (from the 8th bit position), to compensate for those bits truncated from the exponent. The rest of the bits up to the binary point, and two bits beyond, are filled with sign extension bits. In the case where all three exponent LSBs are b' 1, i.e., equal to decimal 7, the first significant bit of the 32-bit significand will be a non-zero bit, i.e., normalizes the significand. Since the significand is represented as 2's complement, two extra bits to the left of the significand point will be used to store sign bits (including an extended sign bit). An additional second sign bit is used, instead of one, in order to preserve the sign because of a possible overflow situation which results in a 2-bit integer overwriting the lower sign bit. (FIG. 5b)

Depending on the sign of the product, the significand is either passed through, or it is inverted, to create 2's complement negative representation of the significand. This implementation differs from IEEE 754 where a significand can be positive or negative. This operation is performed by adding a sign bit to the 24-bit significand and inverting the bits if the sign is equal to 1 (negative).

Figure 5C:
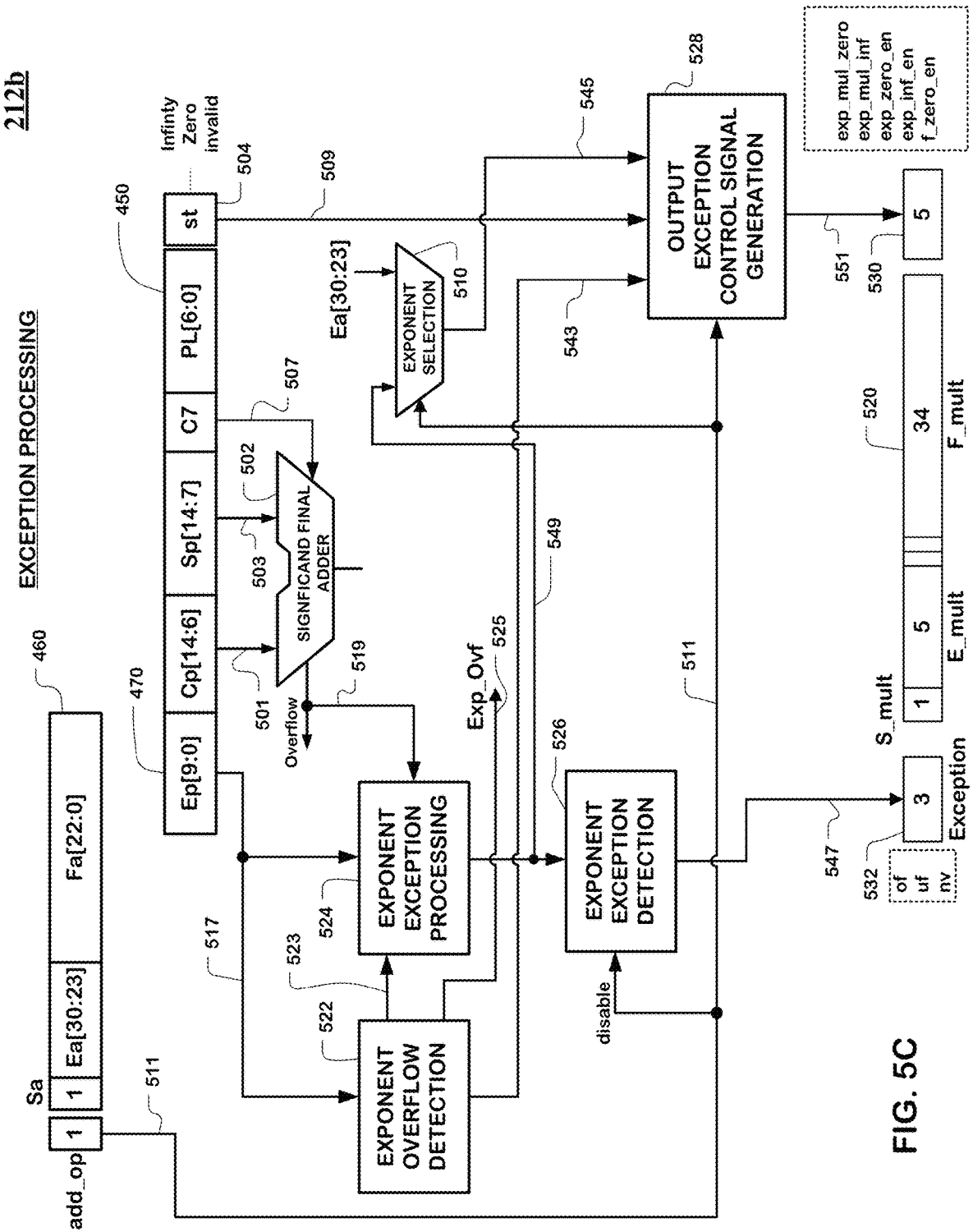
FIG. 5C illustrates an exemplary schematic representation of an Exception Processing block.

The exponent is checked for values between −126 to 126. If greater than 126, it is treated as infinity, or if less than −126 it is a denormalized number (less than −126) and converts to zero. (FIG. 5c)

In some implementations, a final register of this stage of the pipeline contains a normalized floating point product with 5-bit exponent and 34-bit 2's complement significand, (containing duplicate sign of the product, and without the implied 1) and three exponent status bits.

FIG. 5B illustrates an exemplary schematic representation of the final partial product addition, Significand Selection and Radix-8 Conversion sub-block 592a. Register 450 (FIG. 4a) comprises fields for PL [6:0], C7, Sp [14:7], and Cp[14:6]. Register 470 (FIG. 4b) comprises fields for the 10-bit Product Exponent (Ep) value. Register 504 includes a status bit.

In the case the pipeline is operated in the FP32 addition mode, Operand-A is in FP32 format and it bypasses the multiplier. In this case Operand-A originates from the register 460, occupying two combined 16-bit registers, 420 and 421. An add_op control signal on line 511 indicates when the pipeline mode is set for Addition (Single Precision Floating point in this example) or Accumulation.

A Significand Final Adder circuit 502 receives as input Sp[14:7] on line 503, Cp[14:6] on line 501 and the carry bit C7 on line 507, outputting an Overflow signal on line 519 to the Overflow Selection circuit 506. The Overflow Selection circuit 506 has input bus 523 which is a combination of PL[6:0] on line 509 and the Significand Final Adder circuit 502 output on line 521. A NOR gate 522 has the inputs Exponent Overflow bit on line 525 and Zero force bit on line 468 and outputs the signal on line 527. The signal on line 527 and the bus 529 output by the overflow selection circuit 506, route into an AND gate 544, which sets the Significand to all zeroes in case of an exponent overflow, as well in case the Significand is forced to zero. Further, the Significand Selection circuit 512 chooses between the bypass significand Fa [22:0] on bus 515 or the AND gate 544 output on bus 553 using the add_op control signal on line 511.

An Exponent Selection circuit 510 chooses between the 8 exponents bits, Ep [7:0] on line 517 or the bypass exponent bits Ea[30:23] bits on line 513 and outputs the selected exponent on line 533 to the E_mult field of register 520. A sign bit selection circuit 508 receives the Sp sign bit (FIG. 4b) and the bypass sign bit Sa on line 473, as inputs, and outputs a sign bit on line 531 to the S_mult field in register 520.

The add_op control signal on line 511 routes to the Significand Selection circuit 512, the Exponent Selection circuit 510, and the Sign bit selection circuit 508 for their control inputs.

Output from the Significand Selection circuit on line 512, enters 8-bit Left Shifter circuit 514. The lower three bits [2:0] of the line 533 from the Exponent Selection circuit 510 output on line 533 control the 8-bit Left Shifter circuit 514. The 8-bit Left Shifter circuit 514 output bus 537 feeds into multiplexer circuit 518 which chooses between input on line 537 (in case significand is positive) and line 539 (in case significand is negative). This is selected by the sign bit 531. 2's compliment Invert+1 circuit 516 creates 2's complement of the shifter output on line 537 and outputs the complemented values on line 539. The output of the Multiplexer circuit 518 on line 541 enters the pipeline register 520 in a 34-bit F_mult significand. This process converts the selected significand into 2's complement represented significand which is 32 bits long with 2 sign bits, stored in the pipeline register 520.

FIG. 5C illustrates a block diagram of Exponent Exception Processing sub-block 592b. A Significand Final Adder circuit 502 receives the inputs Sp[14:7] 503, Cp[14:6] 501 and the carry bit C7 507 from register 450 as described with reference to FIG. 5b. Overflow output of the Significand Final Adder circuit 502 is connected to the Exponent Exception Processing circuit 524. Upon detection of overflow conditions, the adder circuit 502 asserts the Overflow 519 signal as a first input to the Exponent Exception Processing circuit 524. A second input to the Exponent Exception Processing circuit 524 is the exponent bits Ep [9:0] from register 470 on bus 517. A third input is the Exponent Overflow Detection circuit 522 output signal on line 523. The output of the Exponent Exception Processing circuit 524 is then input on line 549 to the Exponent Exception Detection circuit 526, and the exponent selection circuit 510 (described with reference to FIG. 5b).

The exponent bits Ep [9:0] on a bus 517 are input to the Exponent Overflow Detection circuit 522 which detects the overflow conditions:

exp_ovf=Ec[8], :meaning that if bit 8 is one, there is overflow on exponent detected exp_povf=~Ec[9] & Ec[8]: If bit 9 is zero and bit 8 is one; Positive Overflow, exp_novf=Ec[9] & Ec[8]: If both bit 9 and bit 8 are one; Negative Overflow.

The first output of circuit 522 routes to the Exponent Exception Processing circuit 524, a second output on line 543 routes to the Output Exception Control Signal Generation circuit 528, and a third output includes the Exponent Overflow bit on line 525 to the gate 522 in FIG. 5B.

The Exponent Exception Detection circuit 526 outputs an exception to register 532 including the following three bits: of (overflow); of (underflow); and nv (not valid). This occurs on the detection of the following conditions:

of (Overflow)—Meaning if Ec is 11111111, and no Infinity is detected, it is interpreted as Overflow.

of (Underflow)—Meaning if Ec is 00000000 and Zero (Significand) is not signaled, it is Underflow situation.

nv(Invalid) '1'—Meaning result is Invalid.

The Output Exception Control Signal Generation circuit 528 has four inputs. The first input is the add_op control signal on line 511 which indicates the accumulate or bypass add mode, the second input is the status bit on line 509 (infinity, zero, or invalid), the third input on line 545 routes from the Exponent Selection circuit 510 which multiplexes between the Ea[30:23] bits of register 460 or the output of the Exponent Exception Processing circuit 524, and the fourth input is from a second output on line 543 of the Exponent Overflow Detection circuit 522. The Output Exception Control Signal Generation circuit 528 outputs five bits on line 551 representing exp_mul_zero, exp_mul_inf, exp_zero_en, exp_inf_en, and f_zero_en, which are stored into the register 530.

exp_mul_zero meaning: Multiplier Product Exponent is Zero, exp_mul_inf meaning: Multiplier Product Exponent is Infinity exp_zero_en meaning: Enabled when (one of the multiplier input Exponent is Zero, and both of the multiplier input Exponents are not Zero), or Multiplier product Exponent has negative overflow, exp_inf_en meaning: Enabled when one of the multiplier input Exponent is Infinity, or Multiplier product Exponent has positive overflow f_zero_en meaning: Enabled when exp_zero_en signal is Enabled or Multiplier product Exponent has overflow (Positive or Negative) or when the Multiplier product Exponent is Zero.

Carry-Save Accumulation Unit

Figure 6:
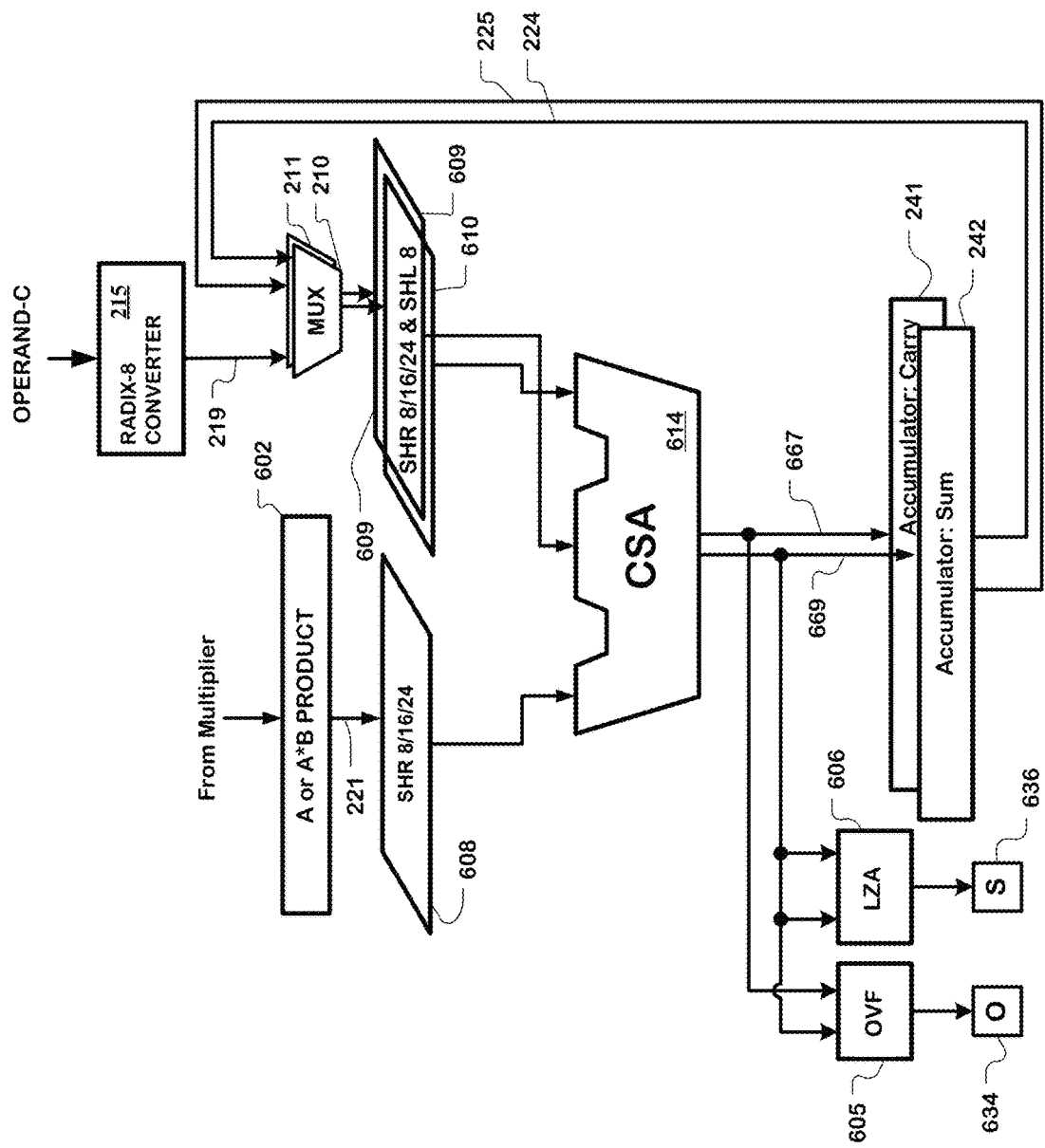
FIG. 6 illustrates a high-level hierarchical block diagram of the Carry-Save Accumulation Unit.

FIG. 6 illustrates a block diagram 600 of a Carry-Save Accumulation Unit (e.g. 240 of FIG. 2) for the significands. A Radix-8 Converter 215 receives Operand-C as an input and outputs operand C in Radix-8 format on line 219 to the Multiplexer 210 and Multiplexer 211. Two additional inputs to the Multiplexers 210 & 211 are the buses 224 & 225 fed back from the accumulator Sum register 242 and accumulator Carry register 241. The outputs of the Multiplexer 210 and Multiplexer 211 route to the shifter circuits 609 & 610 which execute a shifting right 8/16/24 bits or shifting left 8 bits. The outputs of shifter circuits 609 & 610 route to the carry-save adder (CSA) 614. The carry-save adder 614 has a third input from the shift right circuits for 8/16/24 circuit 608 whose input is either the product of a A*B (BF16) or the A (FP32) operand alone, 602. The outputs of the carry-save adder 614 on lines 667 and 669 route to a LZA circuit 606 which provides an output to an S-bit register 636, and to Overflow Detection block 605 which provides an output to the 0-bit register 634.

The carry-save accumulation unit includes a significand circuit receiving at a first pipeline clock for cycle (i) a multiplier output significand of term A(i)*B(i) and feedback sum and carry values of a previous accumulator output representing summation value S(i−1). The significand circuit includes a 2's complement, carry-save adder, to generate sum and carry accumulator output significand values for summation S(i) on a second pipeline clock. The carry-save accumulation unit includes an exponent circuit receiving, at the first pipeline clock, a multiplier output exponent of term A(i)*B(i), and a fed back exponent value of a previous accumulator output representing summation value S(i−1), to generate an accumulator output exponent value on the second pipeline clock for summation value S(i). The significand circuit includes a significand shifter, responsive to exponent comparison signals, stored at the first pipeline clock, to align the multiplier output significand and the feedback sum and carry values for addition. The exponent circuit is responsive to the exponent comparison signals, stored at the first pipeline clock, to generate the accumulator output exponent value. The pipeline includes exponent comparison circuits to compare, prior to the first pipeline clock, the multiplier output exponent of term A(i)*B(i) to the fed back exponent value of summation S(i−1), to generate the exponent comparison signals stored at the first pipeline clock.

The carry-save accumulation unit in this embodiment includes an overflow detector circuit to generate a first condition signal indicating an overflow condition for at least one of the fed back sum and carry values at the first pipeline clock, and a leading sign bit detector circuit to generate a second condition signal indicating that at least one of the fed back sum and carry values has more than, or equal to, a number 8 of extended sign bits at the first pipeline clock. The exponent circuit and significand circuit are also responsive to the first condition signal and the second condition signal. The overflow and leading sign bit adjustments and exponent comparison adjustments are combined for implementation by shifters in a same pipeline cycle, as described with reference to Table 1: CSA Unit Control below.

Also, this stage of the pipeline has an accumulator mode and a summing mode, and includes a selector to provide the fed back accumulator output in the accumulator mode, and to provide a third floating point input operand in the summing mode to the significand circuit and exponent circuit. The significand circuit can include a significand shifter, responsive to exponent comparison signals stored at the first pipeline clock, to align in the accumulator mode the multiplier output significand and the fed back sum and carry values for addition, and to align in the summing mode the multiplier output significand and a significand of the third input operand for addition. The exponent circuit is responsive to the exponent comparison signals stored at the first pipeline clock, to generate the accumulator output exponent value. The pipeline includes exponent comparison circuits to compare, prior to the first pipeline clock, the multiplier output exponent to the fed back exponent value in the accumulator mode, and to compare the multiplier output exponent to an exponent of the third input operand in the summing mode, to generate the exponent comparison signals stored at the first pipeline clock.

Significand Circuit:

There are two paths in the Carry-Save Adder (CSA) significand stage: The Accumulator path where the operand from the accumulator can shift to the right for 8, 16 or 24 bits and can shift to the left for 8 bits, and the Multiplier path where operand from the multiplier can shift to the right for 8, 16 or 24 bits. Shifting right for 8, 16 or 24 bits corresponds to the exponent difference of 1, 2 or 3, between the operands, when using a radix-8 exponent. Shifting Left for 8-bits is done when the carry save adder outputs a number in which sign extension exceeds 8-bits.

If the difference between operand exponents is greater than 3, that means that one of the operands shifts to the right over 24 bits, which aligns the operand too far to the right to be within the range of the greater operand. This case is equivalent to adding zero to the greater operand, or simply passing the greater operand to the accumulator unchanged using a bypass multiplexer. (FIG. 7c)

This implementation eliminates the bypass multiplexer by adding zero to the CSA when the difference in the exponents is greater than 3, and is equivalent to bypassing the operand. Inputs to the CSA are from both the multiplier as well as the accumulator and are gated by AND gates. The Shifter and Exponent Control Unit detects this situation and sets the appropriate operand to zero. This implementation saves one multiplexer stage in each path.

Detection of sign extension occurs after the 3:2 Carry-Save Adder stage. The sign extension bit S, and the overflow bit O are set if the situation is detected, and it is handled in the following pipeline clock. In order not to lose the sign bit due to overflow, a duplicate sign is carried thought the computation. The additional complexity is introduced to increase precision. This involves extending the accumulator to 36 or 40 bits. In another implementation, introducing detection logic improves timing and accuracy. The detection logic takes inputs from three inputs, 683, 685, 689 to the CSA 614, as opposed to two outputs of CSA 614, and is subject of another related disclosure.

Exponent Circuit:

An "Exponent Control Unit" compares the exponent difference between a first exponent operand from the Multiplier and a second exponent operand from the Accumulator. The Exponent Control Unit checks conditions resulting from comparing Multiplier and Accumulator exponents and selects the operand path according to Table 1. Simultaneously, the new accumulator exponent is determined and stored into the Exponent Accumulator (Eacc) register 654. (FIG. 7b).

The exponent part has two branches: left and right branch. The left branch, consisting of inputs 671 and 673 (into the OR gate), selects the greater of the two exponents, which then becomes the resulting exponent. This condition is selected according to the Table 1. The right branch consisting of inputs 675 and 677 (into the exponent output OR gate) will select Ea+1 or Ea−1 according to the conditions described in Table 1. If significand Overflow is signaled, the accumulator significand should be shifted 8-bits to the right (SHR_8) and the exponent incremented by 1.

Overflow (O) detection is performed during the CS Addition. If Overflow is detected, O bit is latched into the output pipeline register. The overflow situation will be corrected in the next cycle according to Table 1.

Implementation of CS-Accumulation

The functioning of both Exponent and Significand paths is interdependent, and it depends on the status of the exponent and "sign extension" (SE) and "overflow" (O) signal produced in the significand part. There are two accumulators, one for carry and the other for sum. They are summed with the product using a 3:2 Carry-Save Adder (CSA) and passing through the two separate paths, one for carry and the other for sum.

The destination registers of the pipeline stage are an Accumulator comprising Carry and Sum (two registers). Performing the conversion into the conventional format occurs in the next pipeline stages (pipeline-4 and pipeline-5). The Carry-Save stage can be a timing critical stage. Therefore, particular attention is given to timing and area guiding the design decisions described in this section. The critical path in this pipeline stage comprises: Exponent control, three 2:1 multiplexers, one 5-bit subtractor, one 5-bit decrementer, and comparison unit, in the exponent part, and, in the significand part, Exponent control, 5-bit incrementor, 3:2 Carry-Save Adder (CSA), and one AND gate. The critical path can traverse exponent and significand paths, as is the case in this design.

Accumulator Design

Figure 7A:
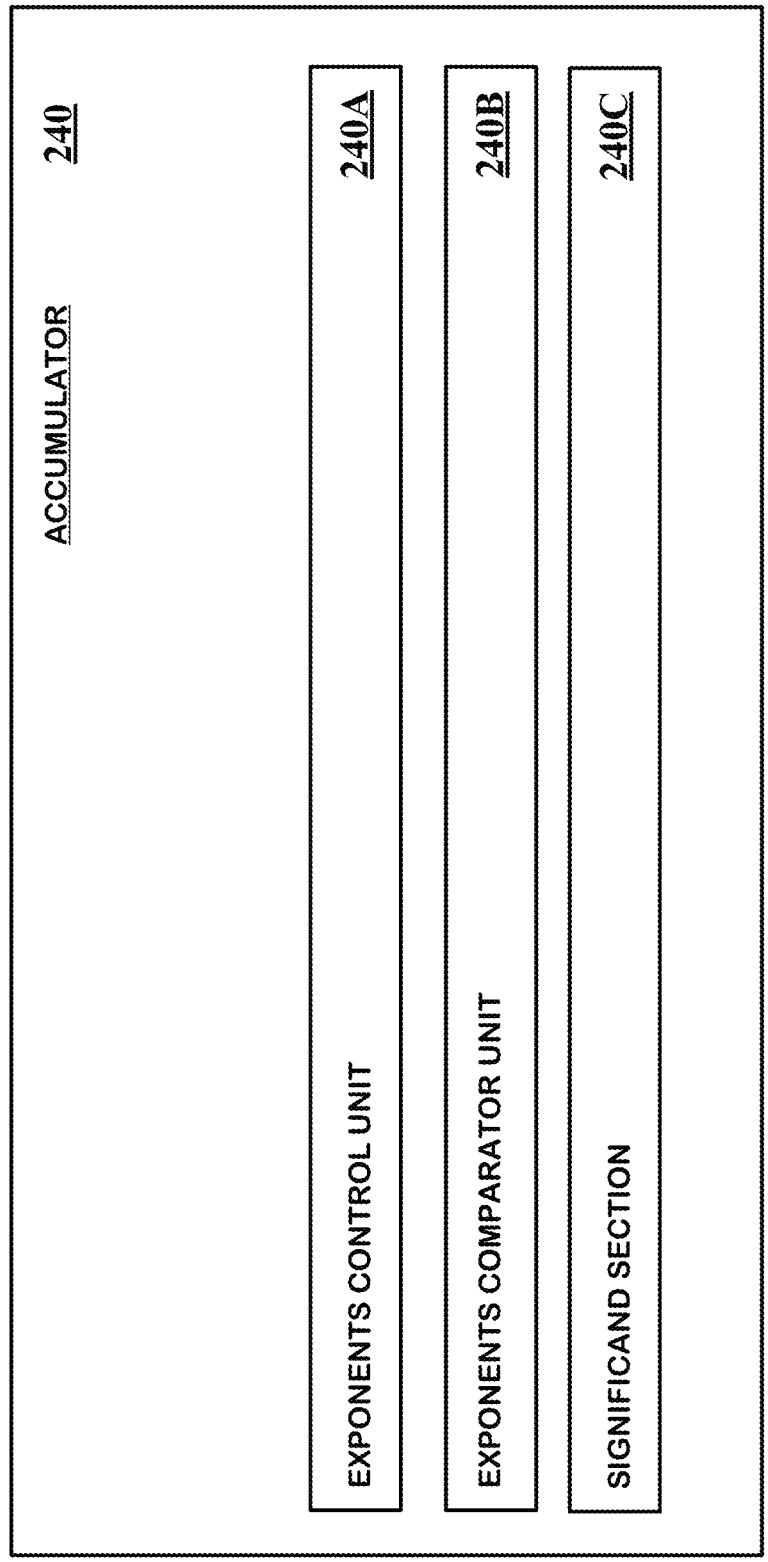
FIG. 7A illustrates a high-level hierarchical block diagram of an Accumulator comprising two hierarchical blocks: Exponents Control Unit and the Significand Unit.
Figure 7B:
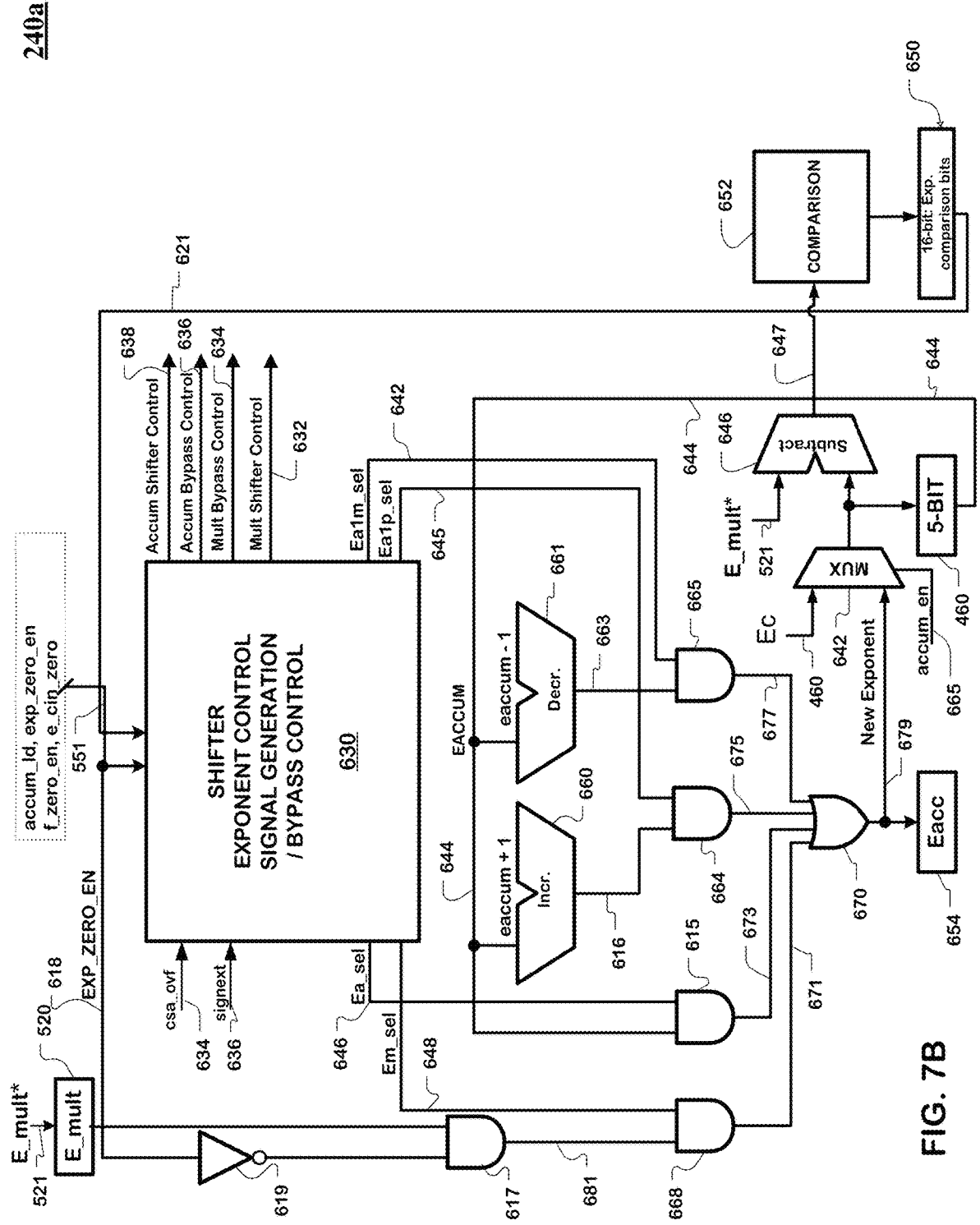
FIG. 7B illustrates an exemplary hierarchical block and schematic diagram of the Exponents Control Unit.
Figure 7C:
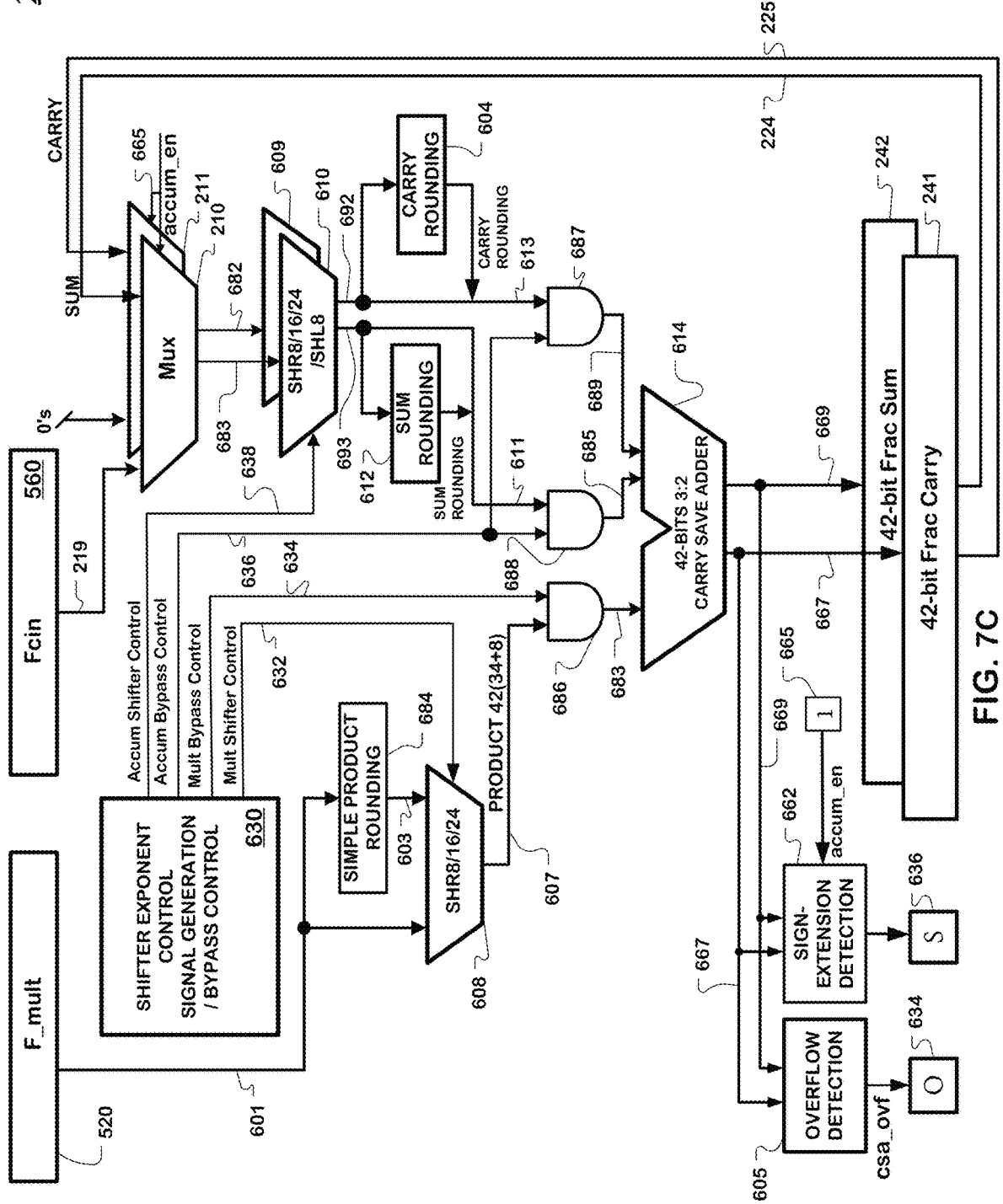
FIG. 7C illustrates an exemplary hierarchical block and schematic diagram of the Significand Unit.

FIG. 7A illustrates a simplified block diagram 610 of an Accumulator 240 comprising three circuit blocks: Exponents Control Unit 240A, Exponents Comparator Unit 240B, and the Significand Section 240C.

FIG. 7B illustrates an exemplary hierarchical block and schematic diagram of the Exponents Control Unit 240A and Exponent Comparator Unit 240B. A Shifter Exponent Control Signal Generation/Bypass Control circuit 630 receives the inputs from: accum_ld, exp_zero_en, f_zero_en, e_cin_zero, 551, csa_ovf bit 634 O, and signext, which is the S-bit 636 in addition to the output of the 16-bit Multiplier Exponent Comparison circuit 652, which stores into register 650, sixteen Exponent Comparison Bits*:

| | |
|---|---|
| z_diff | emult and eaccu are same |
| mgrt | emult is greater than eaccu |
| agrt | eaccu is greater than emult |
| em1p | emult is 1 bigger |
| em2p | emult is 2 bigger |
| em3p | emult is 3 bigger |
| ea1p | eaccu is 1 bigger |
| ea2p | eaccu is 2 bigger |
| ea3p | eaccu is 3 bigger |
| ea4p | eaccu is 4 bigger |
| emz | emult is zero |
| eaz | eaccu is zero |
| eminf | emult is infinity |
| eainf | eaccu is infinity |

*where:
emult: is Product Exponent
eaccu: is Accumulator Exponent
emmp meaning, emult is bigger for more than 3
eamp meaning, eaccu is bigger for more than 4
There are additional control signals:
  accum_ld—meaning: Accumulator receiving input C value.
  exp_zero_en—meaning: setting the Product Exponent to zero.
  f_zero_en—meaning: setting product significand to 0 if Exponent=0 (because denormal is not allowed)
  e_cin_zero—meaning: Input C Exponent equal zero
  Outputs of the Shifter Exponent Control Signal Generation/Bypass Control circuit 630 are the control signals Accum Shifter Control on line 638, Accum bypass Control on line 636, Multiplier bypass Control on line 634, and Multiplier Shifter Control on line 632, Ea_sel on line 646, Ealm_sel on line 642, Em_sel on line 648 and Ealp_sel on line 645.

The Comparison circuit 652 compares the exponents of the two operands arriving from: (1) the multiplier exponent E_mult on line 521 and accumulator exponent on line 679; (2) or input A (from exponent E_mult on line 521 in bypass mode) and the accumulator exponent on line 679; (3) or input A (from exponent E_mult on line 521 in bypass mode) and input C (from the exponent Ec on line 460). The Comparison circuit 652 generates the following condition bits that are stored in the 16-bit condition register 650: emult: Multiplier Exponent; eaccu: Accumulator Exponent; z_diff—emult and eaccu are same; mgrt—emult is greater than eaccu; agrt—eaccu is greater than emult; em1p—emult is 1 bigger; em2p—emult is 2 bigger; em3p—emult is 3 bigger; emmp—emult is more than 3 bigger; ea1p—eaccu is 1 bigger; ea2p—eaccu is 2 bigger; ea3p—eaccu is 3 bigger; ea4p—eaccu is 4 bigger; eamp—eaccu is more than 4 bigger; emz—emult is zero; eaz—eaccu is zero; eminf—emult is infinity; and eainf—eaccu is infinity. The 16-bit condition register 650 interfaces to the Shifter Exponent Control Signal Generation/Bypass Control circuit 630 via bus 621. The condition register 650 stores the results of a comparison of the Eacc from summation S(i−1) and the E_mult register 520 stores the term A(i)*B(i) in the accumulation mode, during the generation of the Eacc for summation S(i).

Inputs on line 647 to the Comparison circuit 652 come from the Subtractor circuit 646. The subtractor circuit 646 receives E_mult on line 521 from the pipeline register 520 and the output of Multiplexer 642, which chooses between Ec of register 460 and the New Exponent output on line 679 of OR Gate 670, where Multiplexer 642 is controlled by the accum_en signal on line 665 which indicate the mode. (FIG. 7b)

Exp_Zero_En on line 618 is applied to inverter 619, the output of which is applied as an input to AND gate 617. The E_mult exponent bits from the pipeline register 520 are input to the AND gate 617 as well, the output of which on line 681 which feeds into to the AND gate 668, with the Em_sal bit on line 648 from control 630 to pass or block E_mult. The output on line 671 of AND gate 668 connects to a four input OR gate 670. The OR gate 670 has three other inputs, including the output of AND gate 615, which is selected by signal Ea_sel to pass or block Eaccum, and the outputs of the incrementor 660 on line 616 and decrementor 661 on line 663c, are each controlled at AND gates 664 and 665 by outputs Ea1p_sel and Ea1m_sel, respectively. Depending on the select signals (of which only one can be 1), 648, 646, 645, 642, proper exponent is selected as an output of the OR gate 670. This output is the Eacc signal, also known as the New-Exponent which is an input to Exponent Accumulator (Eacc) register 654, also input to the Multiplexer 642.

The output of multiplexer 665 (either the "new exponent for summation S(i), or the exponent of the operand C, depending on the mode) is also registered in this embodiment in register 460, which is connected on line 644 as inputs to the incrementer 660 and to the decrementer 661.

So, as the new exponent on line 679 is developed representing summation S(i) using the comparison bits produced with summation S(i−1), the new exponent is compared to the E-mult value for term A(i−1)*B(i−1) in register 520 to generate the comparison signals to be latched with summation S(i), and used for shifter control during generation of summation S(i+1).

FIG. 7C is a schematic diagram of the Significand Unit 240C. A Shifter Exponent Control Signal Generation/Bypass Control circuit 630 is illustrated showing four output control signals. The first control signal is the Accum Shifter Control on line 638 which is the select signal for the shift registers SHR8/16/24/SHL8 609 and 610. Two shift registers circuit: SHR8/16/24/SHL8 609 and 610 receive their inputs on line 682 and on line 683 from a set of Multiplexers, 210 and 211. The accum_en signal on line 665, controls Multiplexer 210 and Multiplexer 211 to choose between the SUM on line 224, CARRY on line 225 or the value on line 219, originating from register Fcin 560 or logic "0" as another input of the multiplexer 211. Multiplexer 210 and Multiplexer 211 output the selected values on bus 682 and bus 683 into shifters SHR8/16/24/SHL8 609 and 610. Shifter 609 and 610 output shifted values on buses 692 and 693. Bus 692 can interface directly to bus 613 or can traverse an optional Carry Rounding block 604 which appends rounding bits to the bus 613. Bus 693 can interface directly to bus 611 or can traverse an optional Sum Rounding block 612, and append rounding bits to 693. Buses 611 and 613 are inputs to the AND gates 687 and 688, the outputs of which are applied as inputs to the Carry-Save Adder 614 on line 689 and 685 (the AND symbol represents a multiplicity of AND gates for each signal line on the busses: 613, 611 and 607. The inputs for the AND gates 688 and the AND gates 686 are selected by control signals on line 633 and on line 634, respectively.

The F_mult value in the pipeline register 520 is input to a Simple Product Rounding block 684 which inputs on line 603 directly to a shift registers SHR 8/16/24 circuit 608. The select signal for SHR 8/16/24 circuit 608 is Multi-Shifter Control 632 which selects between the F_mult input on line 601 and rounded product on line 603. The output is the Product containing 42-bits (34+8) on bus 607, which is applied to an input to the AND gates 686, the output of which is an input to the Carry-save Adder circuit 614.

The 42-Bits 3:2 Carry-save Adder circuit 614 has three inputs, including the output 683 of the AND gates 686, the output 689 of the AND gates 687, and the output 685 of the AND gates 688. The 42-Bits 3:2 Carry-save Adder circuit 614 outputs are two buses: Sum bus 669 and Carry bus 667. The two outputs, 669 and 667 enter the 42-bit Frac Sum register 242 via bus 669 and the 42-bit Frac Carry register 241 via Carry bus 667 respectively. Bus 669 and bus 667 are also inputs to an Overflow Detection block 605 and Sign Extension Detection Unit 662. The two blocks, Overflow Detection block 605 and Sign Extension Detection Unit 662 provide output to the 0-bit 634, which is the csa_ovf signal and the S-bit 636 which is the Sign Extension signal. The Sign Extension Detection unit 662 has an enable bit accum_en signal on line 665 which is set to a logic "1" when the operation is Accumulate. The Sign Extension Detection block is operational only working when the "accum_en" signal is enabled.

There are three operation modes available, which are:

Input-A(BF16)×Input-B(BF16)+Input-C(FP32),

Input-A(BF16)×Input-B(BF16)+Accumulation Loop (summation),

Input-A(FP32)+Input-C(FP32).

The "accum_en" signal is only enabled during the second mode condition (accumulation). In addition mode, Sign Extension Detection is not needed. It is only required in the Accumulation mode as gradual growth of the sign extension bits can only occur during the Accumulation operation.

Sign Extension Detection Unit 662:

According to some aspects, the Sign Extension Detection Unit 662 is attached to the accumulator output of both Sum and Carry. When detecting 10-bits sign (that includes two sign bits, plus additional 8 bits in the first byte of the Sum or Carry) the output shifts left in the following cycle (SHL_8) to preserve operand accuracy. If Sign Extension Detection is not implemented, during the normal operation, the significant bits of the operand gradually shifts to the right until while being replaced with extended sign bits, thus, resulting in the loss of accuracy. In this implementation, every time one of the operands has at least 10 leading sign bits detected; an adjustment executes a shifting of the operands left for 8-bit positions. The exponent is adjusted accordingly by decrementing exponent value by one, which is executed in the same cycle. When S is detected on Carry or Sum portion of the accumulator, S bit is latched in the output pipeline register 636, for a correction in the next cycle. The corrective action executes a shift of the accumulator to the left for 8-bit positions (SHL_8). Sometimes this situation may cancel itself with the next action (requiring SHR_8), often leaving things unchanged as shown in Table 1.

Normalization and Conversion to Sign Magnitude Format

Figure 8A:
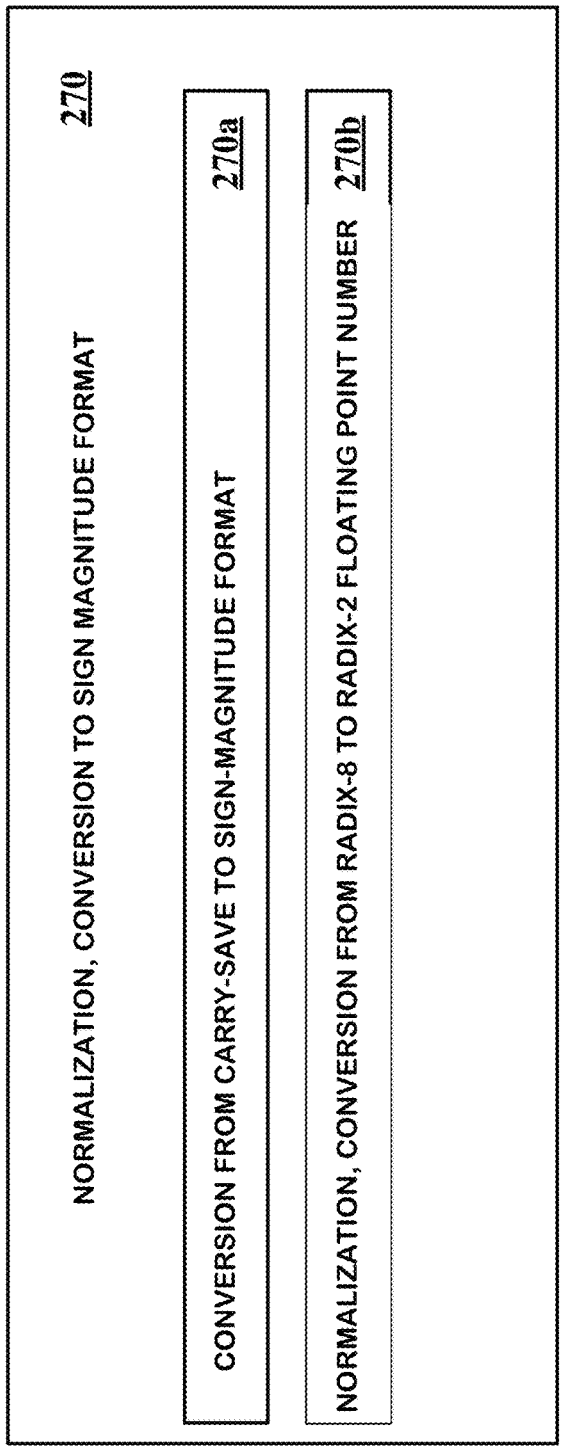
FIG. 8A illustrates an exemplary hierarchical block showing the Normalization, Conversion to Sign Magnitude Format block comprising two sub-blocks, a first Conversion from Carry-Save To Sign Magnitude sub-block and a second Conversion from Radix-8 To Radix-2 Floating Point Number sub-block.

FIG. 8A illustrates the Normalization, Conversion to Sign Magnitude Format block 270 comprising two sub-blocks, a first sub-block is Conversion from Carry-Save To Sign-Magnitude format block 270a and a second sub-block is Conversion from Radix-8 To Radix-2 Floating Point Number block 270b.

Figure 8B:
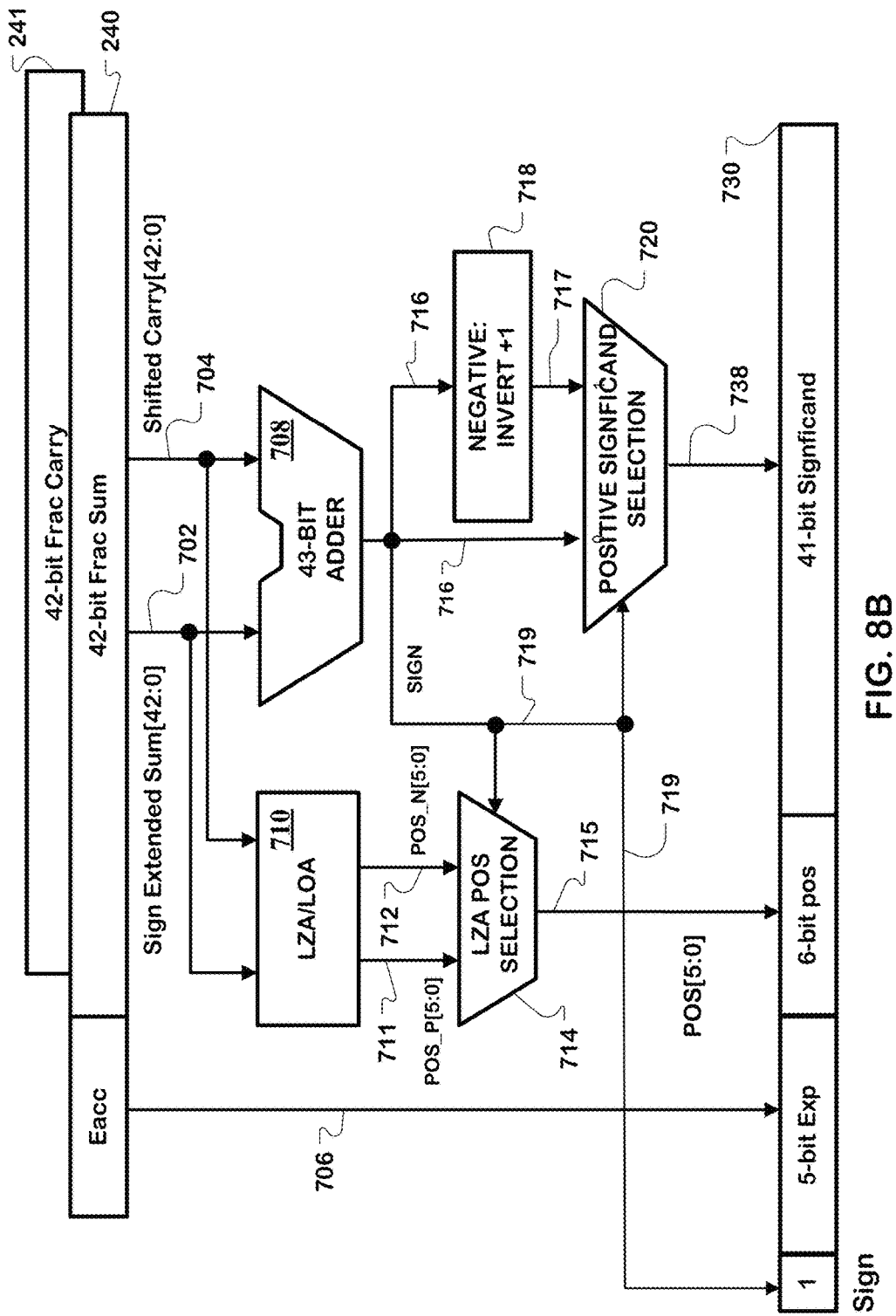
FIG. 8B illustrates an exemplary schematic diagram for the Conversion from Carry-Save To Sign Magnitude block.

FIG. 8B illustrates an exemplary schematic diagram for the Conversion from Carry-Save To Sign-Magnitude block 270a. Two registers, 42-bit Frac Sum register 242, and 42-bit Frac Carry register 241 output the Shifted Carry [42:0] bus 704 and the Sign Extended Sum [42:0] bus 702. A 43-BIT ADDER circuit 708 receives input bus 702 and bus 704. A second circuit LZA/LOA 710 receives input bus 702 and bus 704. The second circuit LZA/LOA 710 outputs two buses POS_P [5:0] on line 711 and POS_N [5:0] on line 712 to a third LZA POS Selection circuit 714. The output of the LZA POS Selection circuit 714 is the POS [5:0] 715 which maps to the register 730 as the 6-bit position, designating the amount of shift left required to normalize significand.

A 43-BIT ADDER circuit 708 outputs the signal SIGN on line 719 to control the LZA POS Selection circuit 714, routes bus 716 to the Significand Selection Multiplexer circuit 720 on the "0" leg input, and routes bus 716 to the input of Negative: Invert+1 circuit 718. The "1" leg of the 2'S Significand Selection Multiplexer circuit 720 receives bus 717, which represents negative significand, converted into a positive one. The SIGN 719 controls the Significand Selection multiplexer, so that the output 738 contains always a positive significand. The output of the 2'S Complement Selection Multiplexer circuit 720 is the bus 738 which maps to the register 730 as the 41-bit positive significand. A 5-bit exponent maps on line 706 directly to the register 730 as well as the SIGN bit 726. This step finishes conversion of the Accumulator significand represented in the Carry-Save format into a Sign-Magnitude Radix-8 format.

In this stage the two values on Sum bus 702 and Carry bus 704 (representing significand in carry-save format), are summed together in the 43-BIT ADDER circuit 708 to produce Sign-Magnitude format of the significand. Leading Zero/Leading One Anticipator (second LZA/LOA circuit) 710 will calculate two numbers: number of Leading Zeroes 711 (in case the significand 716 is positive) and number of leading Ones 712 (in case the significand 716 is negative). Depending on the significand sign bit 719, the correct position will be selected by the multiplexer, LZA POS Selection circuit 714 and will be stored into the register 730. Both LZ and LO positions, POS_P and POS_N are 6-bit long numbers, anticipating the situation containing 32 leading zeroes or ones.

If the significand at the output of the 43-BIT ADDER circuit 708 is negative, this negative number is converted into a positive number (as IEEE 754 uses sign-magnitude representation, i.e., positive significand). For that purpose, 2's complement converter 718 is used. The sign bit 719 will determine controls the multiplexer 720, so that if the number is positive, it will be stored directly into 41-bit significand register 730. In case the output is negative, the output on line 717, which is the value on 716 converted into a positive value, will be passed to register 730 on line 738.

The predicted 6-bit position of the significand will be added to the 5-bit exponent to produce the new 8-bit exponent compliant to the standard floating point number representation, and the significand will be aligned with respect to the floating point significand, using the same 6-bit predicted position. (FIG. 8c)

Figure 8C:
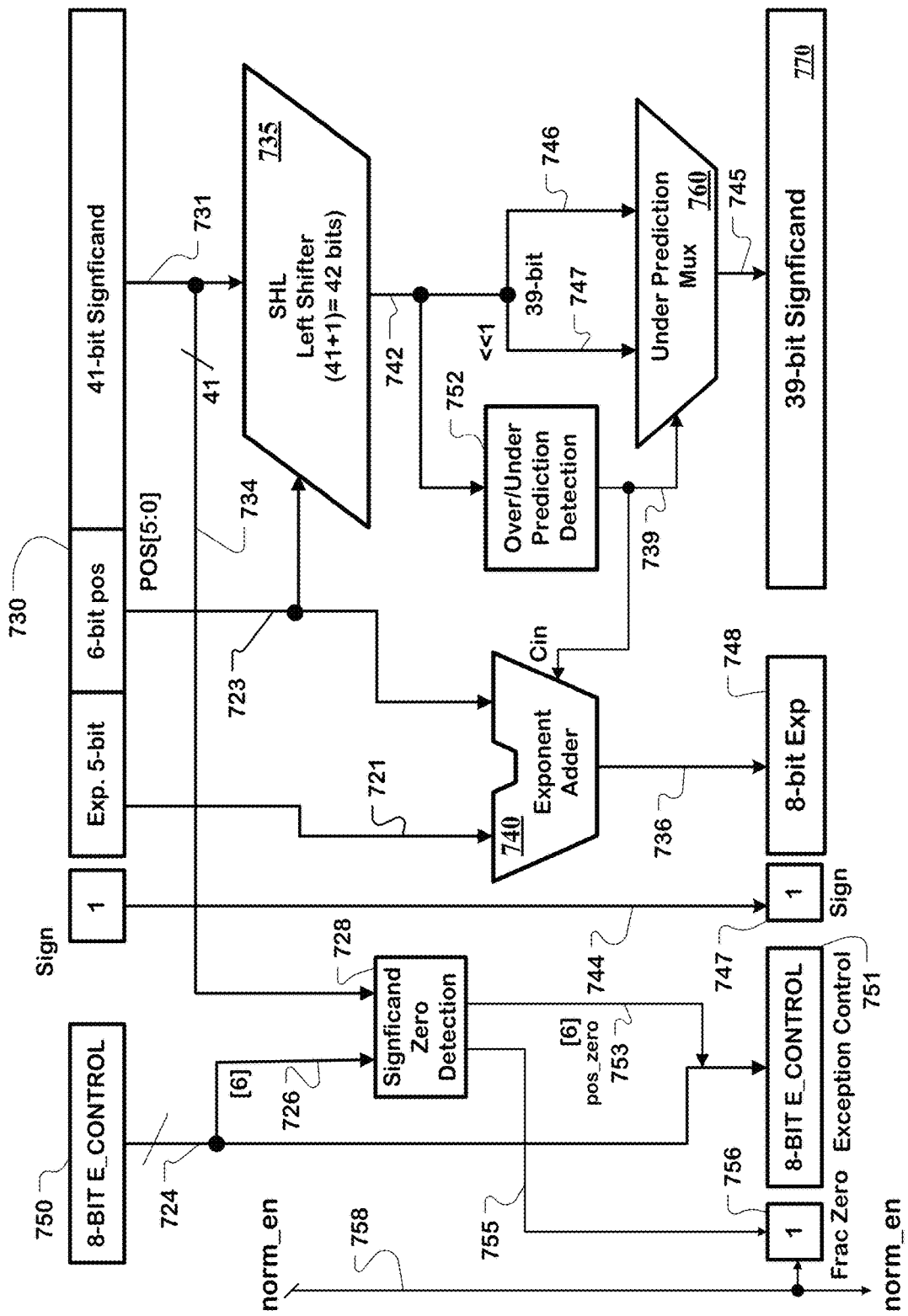
FIG. 8C illustrates an exemplary schematic diagram for the Conversion from Radix-8 To Radix-2 Floating Point Number block.

FIG. 8C illustrates an exemplary schematic diagram for the Conversion from Radix-8 To Radix-2 Floating Point Number block 270b. The register 730 interfaces to the SHL Left shifter circuit 735 via the 41-bit bus 731. The 6-bit position field of register 730 provides Pos [5:0] on line 723 to control the SHL Left shifter circuit 735. The Pos [5:0] on line 723 is also an input to the Exponent adder circuit 740. The Exponent 5-bit field of register 730 is a second input on line 721 to the Exponent Adder circuit 740. Circuit 740 adjusts (increments) the exponent for the number of positions the significand is shifted to the left as indicated by the POS[5:0], and provide an output on line 736 to register 748. However, given that the predictor can be in error for one position, the output of the shifter is passed to the Over/Under Detection Detection circuit 752 which will signal the error by issuing the signal on line 739 which is applied to the carry input of adder 740 and to a control input of under detection multiplexer 760. Under Detection Multiplexer 760 has an input on line 746 where significand on line 742 from shifter 735 is in the same position (no error detected), and an input on line 747 where significand on line 742 is shifted for one bit position to the left (error detected). If the signal 739 indicates under detection, correct output will be latched into the register 770 via bus 745. The error in exponent adjustment is corrected by entering 1 into the adder via carry-in input. The SIGN value is copied from register 730 to register 747.

The sign bit in register 730 is passed through on line 744 to register 747.

The Exception Control (8-bit) register 750 passes its value on line 724 to Exception Control register_751. The meaning of the Exception Control register bits is given as:

| | |
|---|---|
| exp_inf_en: | Operand A is infinity or Operand B is infinity |
| z_diff | Accumulator exponent equal to Product exponent |
| s_mult: | Product Sign |
| s_cin: | Input C Sign |
| e_mul_zero: | Product Exponent = 0 |
| e_cin_zero: | Input C Exponent = 0 |
| e_mul_inf: | Product Exponent is equal to infinity. |
| e_cin_inf: | Input C Exponent is equal to infinity. |

The bit six 726 of the Exception Control Register 750, is "z_diff" and indicates that the result of the exponent comparison between accumulator and product exponent. When equal to 1, The exponent of the Accumulator is equal to the exponent of the product. When "z_diff"=zero, it indicates that the Accumulator exponent is smaller or equal to the product exponent. The bit [6] "z_diff" is the first input on line 726 to the Significand Zero Detection circuit 728. The Significand Zero Detection circuit 728 outputs 1-bit signal on line 753, which replaces bit [6] "z_diff", in the Exception Control register 751 now becoming "pos_zero" 753, indicating that the resulting significand is zero. A second output of the Significand Zero Detection circuit 728 provides signal on line 755 for the Frac-Zero register 756 once accumulation operation is finished and operation proceeds to normalization.

Figure 9A:
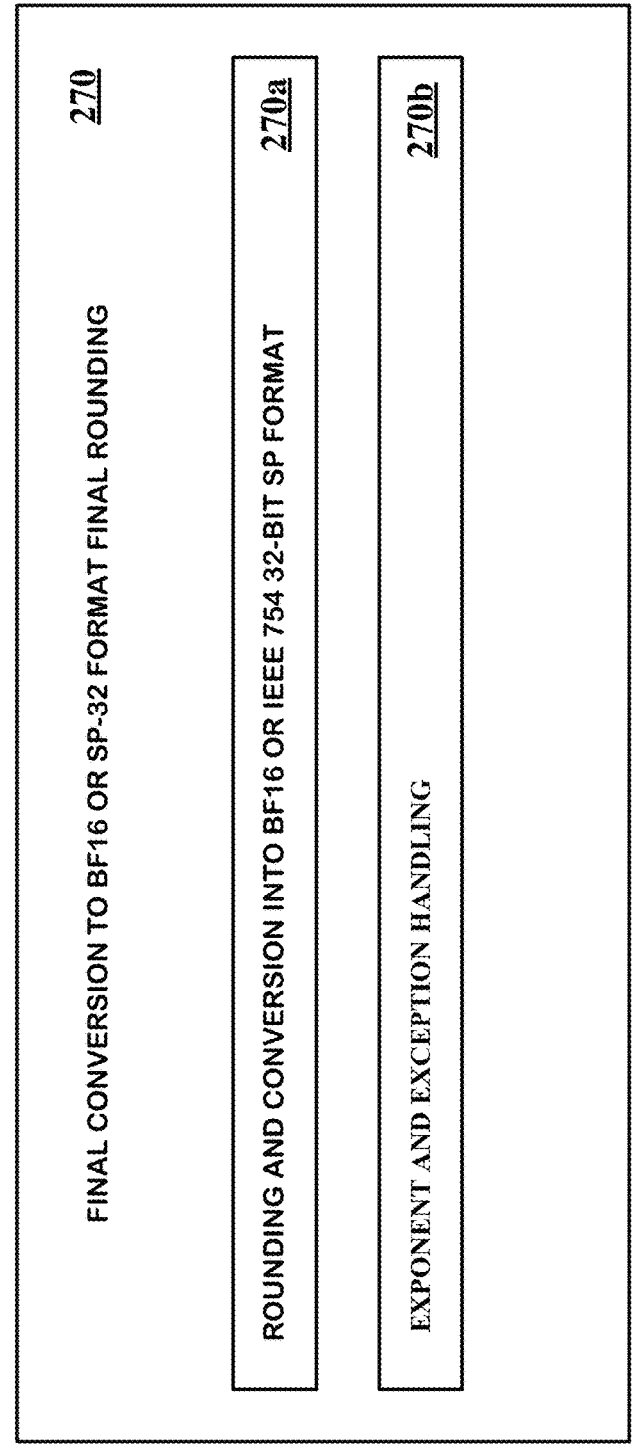
FIG. 9A illustrates an exemplary hierarchical block showing Rounding and Conversion into BF16 or IEEE 754 32-Bit Single Precision Format sub-block and an exponent and exception handling sub-block.

FIG. 9A illustrates block 270 performing Final Conversion into BF16 or IEEE 754 32-Bit Single Precision Format, consisting of sub-block 270a performing Rounding and Conversion into BF16 or IEEE 754 32-Bit Single Precision Format and sub-block 270b performing Exponent and Exception Handling.

Rounding and Conversion to FP32 Format

According to some aspects, the final stage is pipeline-6 which performs rounding of the result to a standard Floating point Sign/Magnitude number with the following: sign bit, 8-bit exponent, 23 bit, normalized significand (+1 implied integer bit). In the process of converting from the 31-bit significand to 24-bit normalized significand with one implied bit, rounding of the result from 31 to 24-bit is performed. In this implementation two rounding modes are implemented: Round Towards Zero (RTZ) truncate, Round to Nearest Even, (RNE). However, any other rounding modes e.g., Round to Nearest Odd (RNO) are easily incorporated.

According to some aspects, rounding logic checks the last 15 LSB bits out of 39 significand bits (not counting GRS bits which make the total 42-bits, 39+3 GRS bits) from the register 770 and determine if the remaining 24 bits require rounding (according to the rule applied: RNE or RTZ). Incrementor needed for RNE is contained in the Rounding box. The three bits, GRS, carried over from the accumulator (CSA) operations are ignored in this implementation. They could be incorporated in the final rounding in other possible implementations.

Rounding is done in one of the several ways:
  (a) During CS Accumulate operation Rounding to Nearest Odd (RNO) is applied,
    on Sum signal only with rounding bit being inserted into the Carry LSB open position,
    on each Sum and Carry signal separately,
  (b) During CS Accumulate, and in the pipeline-6 stage (final rounding), and
  (c) Only in the pipeline-6 stage, while CSA is disabled.

Each of the rounding modes is applied according to the accuracy and particular requirement imposed by a particular application program.

The output to pipeline-6 is either FP32 or BF16, as required. Therefore, the significand length is either 24 (23+ implied bit) or 8-bit (7+implied bit). That is controlled by the "Out_FP32" signal applied to the first Multiplexer. In case rounding resulted in 25-bit significand, significand will be right-shifted for one position and exponent will be incremented by one.

The properly normalized and rounded result is stored in the output register of the pipeline-6, as either BF16 number consisting of 1-bit sign, 8-bit exponent, and 7-bit fraction of the significand, or FP32 number consisting of 1-bit sign, 8-bit exponent, and 23-bit fraction of the significand.

Figure 9B:
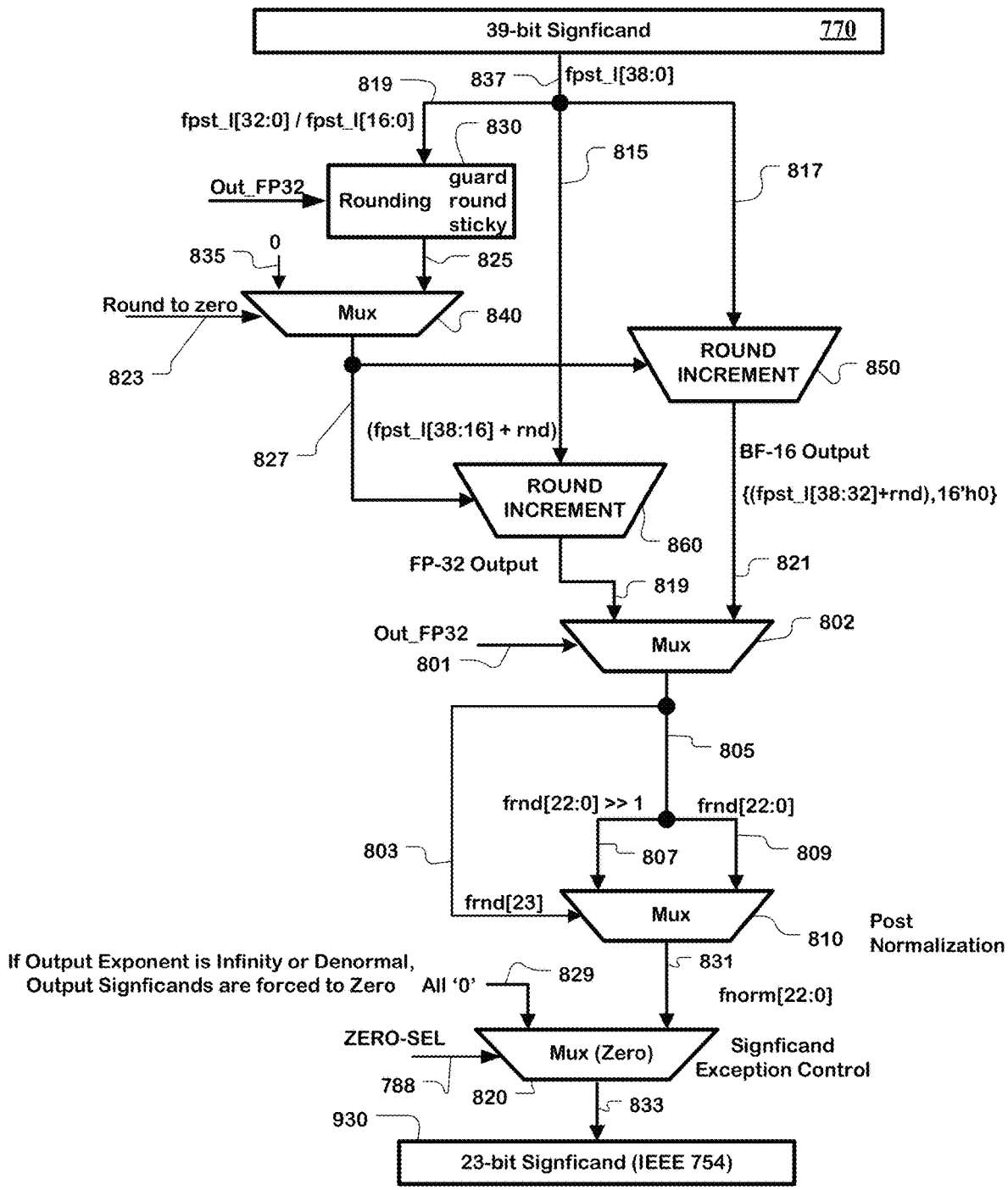
FIG. 9B illustrates an exemplary schematic diagram showing the Rounding and Conversion into BF16 or IEEE 754 32-Bit SP Format block.

FIG. 9B illustrates an exemplary schematic diagram showing the Rounding and Conversion into BF16 or IEEE 754 32-Bit SP Format. The 39-bit significand register 770 bus fpst_1 [38:0] 837 provides fpst_1 [32:0] 819 or fpst_1 [16:0] 819 to a Rounding circuit 830 comprising the guard, round, and sticky bits. The control Out_FP32 selects the portion of the significand on line 819 which is to be rounded by Rounding circuit 830. In case 32-bit SP format is selected, the upper 24-bits [38:16] are augmented with 3 round bits. A Multiplexer 840 chooses between a "0" input on line 835 or the Rounding circuit 830 output on line 825 where the Multiplexer 840 is controlled by the Round to Zero select line 823. This situation occurs when the exponent exceeds −126 and the significand becomes de-normalized, which in this implementation results in rounding to zero. The output on line 827 routes 23-bits (one implied) and 3-rounding bits to a first Round Increment circuit 860 resulting in properly rounded significand in IEEE 754 SP 32-bit format on line 819.

The second Round Increment circuit 850 is operative for rounding into BF-16 format, when BF16 output format is selected. The conversion of the 39-bit significand on line 817 from fpst_1 [38:0] 817 to the BF-16 output is done in Round Increment circuit 850 resulting in 7-bits (one implied), augmented with 1 rounding decision bit, and with 16 zeros appended. This represents significand at the output on line 821 as one of the Multiplexer 802 inputs.

A first Multiplexer 802 selects the FP-32 or BF16 output using the control line signal Out_FP32 801. When Out_FP32 801 is active, it outputs the FP-32 format significand on line 805. When the Out_FP32 801 control signal is inactive, the output on line 805 is in BF-16 format significand. The output of the first Multiplexer 802 is bus 805 which divides into bus 807 and bus 809, entering the second Multiplexer 810. The Multiplexer 810 is controlled by the 24-th bit of the output bus on line 805, frnd [23] signal on line 803. In case rounding produced a 25-bit significand, the 24-th bit will be one. In this case, signal on line 803 frnd [23] bit selects the input bus 807 which is bus 805 shifted for one bit position to the right. (frnd [23] signal will also increment the exponent of the result for 1, to adjust for the right shift.

In case frnd [23] is equal 0, right shift is not needed and the bus 805 will pass straight to the output on line 831, via selected input bus 809.

The third Multiplexer (Zero) 820 chooses between an all "0" on line 829 input or the fnorm [22:0] on line 831. If the Output Exponent is Infinity or Denormal, Output Significands are forced to Zero which is done via ZERO_SEL on line 788 control signal, which choses all '0' input 829. If there is no exception the normalized significand bus 831 is routed as bus 833 and maps to the 23-bit Significand (IEEE 754) register 930.

FIG. 9C illustrates an exemplary schematic diagram showing Exponent and Exception Handling block 270b. An 8-bit Exponent 748 provides the EPST_L [9:0] 964 bus and is incremented by 1 if frnd[23]=1. This is accomplished by routing frnd[23] into the carry-in position of the incrementor 982. The output of exponent incrementor 982 is the 9-bit Enorm [8:0] bus 968 which is a first input to a first Multiplexer (Zero) 974. The second input to the first Multiplexer (Zero) 974 are ALL '0's bus 829. The purpose of the first Multiplexer (Zero) 974 is to set the exponent to all '0' in case this is required by an exception, indicated by Exception Control (8-bit) register 750, via Zero Control logic 970.

The Exception Control (8-bit) register 750 operates on the following eight conditions 953: exp_inf_en, pos_zero, s_mult, s_cin, e_mul_zero, e_cin_zero, e_mul_zero and e_cin_inf.

The Zero Control logic 970 has three inputs: sign_diff on line 961 from the XOR gate and, e_cin_zero on line 959, e_mul_zero on line 957 from an Exception Control (8-bit) register 750, and the output on line 972 controls the first Multiplexer (Zero) 974. The output on line 975 of the first Multiplexer (Zero) 974 passes through the Multiplexer 976 providing the exponent signal bus 979 which is stored in the Exponent register 980. In case Infinity Control 962 signals infinity on line 963, ALL '1' input on line 907 is passed through the multiplexer 976 setting all exponent bits to '1', as recommended by the IEEE 754 standard. The meaning of signals is:

| | |
|---|---|
| exp_inf_en | Operand A is infinity or Operand B is infinity |
| pos_zero | resulting significand is zero |
| s_mult | Product Sign |
| s_cin | Input C Sign |
| e_mul_zero | Product Exponent = 0 |
| e_cin_zero | Input C Exponent = 0 |
| e_mul_inf | Product Exponent is equal to infinity. |
| e_cin_inf | Input C Exponent is equal to infinity. |

In addition, signal "sign_diff" indicating that the sign of the product "s_mult" and sign of the input C, "s_cin" are different. This signal is obtained by applying an XOR function to s_mult and s_cin signals taken from the Exception Control (8-bit) register 750.

The Exception Control (8-bit) register 750 provides the following signals: s_cin, s_mult, exp_inf_en, e_cin_inf, e_mul_inf, pos_zero, sign_diff, on the bus 965 to the Sign Generation and Exception Processing circuit 988 and the Underflow/Overflow Detection and Exponent Exception Detection circuit 986. The control signals for the circuit 986 are norm_en 758 on line 969 and Frac Zero register 756 on line 971. The outputs of the circuit 986 are three signals ov (Overflow), of (Underflow) and (Invalid) nv. A fourth output on line 991 is sent to the Sign Generation and Exception Processing circuit 988 from the Infinity detection circuit 992 indicating overflow.

Signals have the following abbreviations as follows: s_cin (Input C Sign), s_mult (Product Sign), e_mul_zero (Product Exponent Zero), e_cin_zero (Input C Exponent Zero), e_mul_inf (Product Exponent Infinity), and e_cin_inf (Input C Exponent Infinity).

Two correlated events contribute to underflow. One is the creation of a tiny nonzero result between $\pm 2^{-126}$ [where −126 is minimal exponent value] which, because it is so small, may later cause some other exception such as overflow upon division. The other event is the extraordinary loss of accuracy during the approximation of such small numbers. Loss of accuracy may be detected when delivered result differs from what would have been computed were both exponent range and precision unbounded. The IEEE Standard 754 does not track accuracy other than to require single and double precision. In this disclosed implementation, "denormal" numbers are not used and any value where exponent value is −126, and significand is smaller than 1, will be converted to zero. Zero is represented by setting all the significand bits to zero and exponent value to zero, which is handled by Exception Processing Circuits in our disclosed implementation.

The Sign Generation and Exception Processing circuit 988 receives an input from the Exception Control (8-bit) register 750 via bus 965 and Infinity detection circuit 992. The output of Sign Generation and Exception Processing circuit 988 is a SIGN bit which is stored into the register 990 via signal line 983.

An Infinity detection circuit 992 operates on the exponent bus 979 input and if it detects all exponent bits to be 1, it will provide '1' to the OR gate 987 which will in turn set its output 788 to '1'. This sets ZERO-SEL signal 788 which sets significand to all zero (Mux 820, FIG. 9B).

Denormal Circuit 994 detects the situation when the exponent value on exponent bus 979 is out of range, and signals underflow situation on signal line 967. This condition is also signaled to the OR gate 987 which generates the signal ZERO-SEL on line 788. ZERO-SEL signal on line 788 (FIG. 9B) will instruct the Multiplexer 820 to insert all "0"s into the significand, thus creating proper IEEE 754 "Zero" representation (both exponent and significand contain all "0"s).

TABLE 1

CSA Unit Control

| | | Input Conditions | | Output Control | | |
|---|---|---|---|---|---|---|
| | | | Overflow Signext Inputs | Significand Output Mux Control | | Exponent Output (alternate) |
| | | Exponent | Condition | Mult. | Accu. | Bypass |
| Ea = Em | 1 | Ea = Em | (OV = 0 & SE = 0) (OV = 1 & SE = 1) | Fm | Fa | Ea (Em) |
| | | | (OV = 0 & SE = 1) | | | |
| | | | OV = 1 & SE = 0 | Fm >> 8 | Fa >> 8 | Ea + 1 (Em + 1) |
| Ea > Em | 2 | Ea = Em + 1 | (OV = 0 & SE = 0) (OV = 1 & SE = 1) | Fm >> 8 | Fa | Ea |
| | | | OV = 1 & SE = 0 | Fm >> 16 | Fa >> 8 | Ea + 1 |
| | | | OV = 0 & SE = 1 | Fm | Fa << 8 | Ea − 1 (Em) |
| | 3 | Ea = Em + 2 | (OV = 0 & SE = 0) (OV = 1 & SE = 1) | Fm >> 16 | Fa | Ea |
| | | | OV = 1 & SE = 0 | Fm >> 24 | Fa >> 8 | Ea + 1 |
| | | | OV = 0 & SE = 1 | Fm >> 8 | Fa << 8 | Ea − 1 (Em + 1) |
| | 4 | Ea = Em + 3 | (OV = 0 & SE = 0) (OV = 1 & SE = 1) | Fm >> 24 | Fa | Ea |
| | | | OV = 1 & SE = 0 | (Fm) | Fa >> 8 | Ea + 1 Bypass (Acc) |
| | | | OV = 0 & SE = 1 | Fm >> 16 | Fa << 8 | Ea − 1 (Em + 1) |
| | 5 | Ea > Em + 3 | (OV = 0 & SE = 0) (OV = 1 & SE = 1) | (Fm) | Fa | Ea Bypass (Acc) |
| | | | OV = 1 & SE = 0 | (Fm) | Fa >> 8 | Ea + 1 Bypass (Acc) |
| | | | OV = 0 & SE = 1 | If Ea = Em + 4 Fm >> 24 | Fa << 8 | Ea − 1 |
| | | | | If Ea > Em + 4 (Fm) | Fa << 8 | Ea − 1 Bypass (Acc) |
| Ea < Em | 6 | Em = Ea + 1 | | Fm | Fa >> 8 | Em |
| | 7 | Em = Ea + 2 | | Fm | Fa >> 16 | Em |
| | 8 | Em = Ea + 3 | | Fm | Fa >> 24 | Em |
| | 9 | Em > Ea + 3 | | Fm | (Fa) | Em Bypass (Mult) |

A Floating point Multiply-Add Accumulate Unit using Carry-Save addition and accumulation with a radix-8 exponent is described. This balances the critical timing in the exponent unit against that of the significand unit. Also, unlike utilizing sign-magnitude representation as proposed in the Floating point IEEE-754 standard, a 2's complement number system is used to represent a positive and a negative significand which also carries the sign of the operand. This avoids unnecessary subtraction of significands when the exponents are equal to determine the greater of the two as imposed by the IEEE-754 standard. Introducing 2's complement representation requires novel Leading Zero (Leading One) Detector (Predictor) which works on both positive and negative numbers. The same applies to Overflow (OV) detection. In addition, it is necessary to determine when addition of Carry and Sum results in a long Sign Extension (SE), requiring introduction of novel design features.

Floating point Multiply-Add-Accumulate Unit, supporting BF16 format for Multiply-Accumulate operations, and FP32 Single-Precision Addition complying to IEEE 754 Standard is described. The Multiply-Accumulate unit uses higher internal precision and longer accumulator by converting the operands into a higher-radix and longer internal 2's complement significand representation to facilitate precision as well as comparison and operation with negative numbers. The addition is performed using Carry-Save format to avoid long carry propagation and speed up the operation. Operations including overflow detection, zero detection and sign extension are adopted for 2s complement and Carry-Save format. Handling of Overflow and Sign Extension allows for fast operation relatively independent on the size of the accumulator. Rounding suitable for Machine Learning is introduced in the Accumulate operation without timing impact, considerably improving the accuracy of the computation.

What is claimed is:

1. A multiply-and-accumulate unit, comprising:
a pipeline configured to execute a multiply-and-accumulate operation for a sequence of input floating point operands, the pipeline including:
a significand circuit receiving in a pipeline cycle a multiplier output significand in a 2's complement format and fed back sum and carry values of a fed back accumulator output, the significand circuit including a 2's complement, carry-save adder, to generate sum and carry accumulator output significand values of an accumulator output; and
an exponent circuit receiving in the pipeline cycle, a multiplier output exponent in radix-8 format and a fed back exponent value of the fed back accumulator output in the radix-8 format, to generate an accumulator output exponent value of the accumulator output.

2. The multiply-and-accumulate unit of claim 1, wherein:
the significand circuit includes a significand shifter, responsive to exponent comparison signals, to align the multiplier output significand and the fed back sum and carry values for addition;
the exponent circuit is responsive to the exponent comparison signals to generate the accumulator output exponent value; and
the pipeline includes exponent comparison circuits to compare prior to the pipeline cycle the multiplier output exponent to the fed back exponent value to generate the exponent comparison signals.

3. The multiply-and-accumulate unit of claim 2, wherein the pipeline includes:
an overflow detector circuit, to generate an overflow signal indicating an overflow condition for at least one of the fed back sum and carry values; and
the exponent circuit and significand circuit are also responsive to the overflow signal.

4. The multiply-and-accumulate unit of claim 2, wherein the pipeline includes:
an overflow detector circuit, to generate a first condition signal indicating an overflow condition for at least one of the fed back sum and carry values;
a leading sign bit detector circuit, to generate a second condition signal indicating that at least one of the fed back sum and carry values has more than or equal to a number 8 of extended sign bits; and
the exponent circuit and significand circuit are also responsive to the first condition signal and the second condition signal.

5. The multiply-and-accumulate unit of claim 1, wherein the pipeline includes:
a multiplier circuit to provide multiplier significand and multiplier exponent values prior to the pipeline cycle in response to first and second input operands;
a radix-8 conversion circuit to convert the multiplier significand and multiplier exponent values to radix-8 format for the multiplier output exponent and significand; and
a 2's complement conversion circuit to convert the multiplier significand value to a 2's complement representation for the multiplier output significand.

6. The multiply-and-accumulate unit of claim 1, wherein the pipeline includes:
a multiplier circuit to provide multiplier significand and multiplier exponent values prior to the pipeline cycle in response to first and second input operands, wherein the multiplier circuit includes a significand multiplier circuit and an exponent adder circuit, the significand multiplier circuit having carry-save adders for partial products used to generate carry and sum values to generate higher order bits of the multiplier output significand and a ripple-carry adder for partial products used to generate lower order bits of the significand carry and sum outputs.

7. The multiply-and-accumulate unit of claim 1, wherein the pipeline includes:
a multiplier circuit, including a significand multiplier circuit and an exponent adder circuit, to provide multiplier significand and multiplier exponent values prior to the pipeline cycle in response to first and second input operands, and wherein the first and second input operands are in a floating point format including an offset so that negative exponents are represented by positive binary numbers, and a circuit to correct for the offset inverts a most significant bit of one of the first and second operands and adds 1 to a carry-in input of the exponent adder circuit.

8. The multiply-and-accumulate unit of claim 1, wherein the pipeline has an accumulator mode and a summing mode, and includes:
a selector to provide the fed back accumulator output in the accumulator mode, and to provide a third floating point input operand in the summing mode to the significand circuit and exponent circuit.

9. The multiply-and-accumulate unit of claim 1, wherein the pipeline includes:
a first stage including a floating point multiplier with sum and carry outputs;
a second stage including a multiplier output adder for the sum and carry outputs of the multiplier and circuits to convert the multiplier adder output to radix-8 format with a 2's complement significand;
a third stage including said significand circuit and said exponent circuit;
a fourth stage to convert the accumulator sign bit, an accumulator exponent and accumulator significand sum and carry values to a sign-magnitude significand format;
a fifth stage to convert the sign-magnitude significand format from radix-8 alignment to radix-2 alignment, and produce a normalized exponent and significand; and
a sixth stage to perform rounding and conversion to a standard floating point representation.

10. A multiply-and-accumulate method to calculate a summation S(i) of terms A(i)*B(i), where (i) goes from 0 to N−1, and N is a number of terms in the summation, the method comprising:
receiving a sequence of operands A(i) and operands B(i) in floating point format, for (i) going from 1 to N at a multiply-and-accumulate unit;
multiplying operand A(i) and operand B(i) by a multiplier pipeline stage of the multiply-and-accumulate unit to generate term A(i)*B(i) in a format including a multiplier output exponent in a radix-8 format and a multiplier output significand, and converting the multiplier output significand to a 2's complement format;
using a carry-save adder in an accumulator pipeline stage of the multiply-and-accumulate unit to add the multiplier output significand of term A(i)*B(i) in the 2's complement format to a significand of summation S(i−1), and generate sum and carry values for summation S(i);
selecting an exponent of summation S(i) from the multiplier output exponent of A(i)*B(i) and an exponent of summation S(i−1), by an exponent circuit of the multiply-and-accumulate unit, to generate exponent of summation S(i) in the radix-8 format; and
converting the sum and carry values and the exponent of summation S(i), in the radix-8 format, to a normalized floating point format.

11. The multiply-and-accumulate method of claim 10, including comparing the exponent of summation S(i−1) to the multiplier output exponent of term A(i)*B(i) to generate exponent comparison signals; and
aligning, responsive to exponent comparison signals, the sum and carry values of summation S(i−1) with the significand of term A(i)*B(i) for addition in the carry-save adder.

12. The multiply-and-accumulate method of claim 11, including
generating an overflow signal indicating an overflow condition for at least one of the sum and carry values of summation S(i−1); and
aligning, responsive to the overflow signal, the sum and carry values and exponent of summation S(i−1) with the multiplier output exponent and multiplier output significand of term A(i)*B(i) for addition in the carry-save adder.

13. The multiply-and-accumulate method of claim 11, including:
generating a first condition signal indicating an overflow condition for at least one of the sum and carry values of summation S(i−1);
generating a second condition signal indicating that at least one of the sum and carry values of summation S(i−1) has more than or equal to a number 8 of extended sign bits; and
aligning, responsive to the first and second condition signals, the sum and carry values and exponent of summation S(i−1) with the multiplier output exponent and multiplier output significand of term A(i)*B(i) for addition in the carry-save adder.

14. The multiply-and-accumulate method of claim 10, wherein multiplying operand A(i) and operand B(i) to generate term A(i)*B(i) includes using carry-save adders for partial products used to generate carry and sum values to generate higher order bits of the multiplier output significand and a ripple-carry adder for partial products used to generate lower order bits of the significand carry and sum outputs.

15. The multiply-and-accumulate method of claim 10, wherein operand A(i) and operand B(i) are in a floating point format including an offset so that negative exponents are represented by positive binary numbers, and correcting for the offset includes inverting a most significant bit of one of the operand A(i) and operand B(i) and adding one to a carry-in input of an exponent adder circuit.

16. A multiply-and-accumulate unit, comprising:
a pipeline configured to execute a floating point, multiply-and-accumulate operation for a summation S(i) of terms A(i)*B(i), where (i) goes from 0 to N−1, and N is a number of terms in the summation, the pipeline including:
a multiplier pipeline stage including a multiplier circuit to provide multiplier significand and multiplier exponent values of a term A(i)*B(i) in response to first and second input operands, a radix-8 conversion circuit to convert the multiplier significand and multiplier exponent values of term A(i)*B(i) to radix-8 format, and a 2's complement conversion circuit to convert the multiplier significand value to a 2's complement representation for a multiplier output significand of term A(i)*B(i);
an accumulator stage including a significand circuit add the multiplier output significand of term A(i)*B(i) to fed back sum and carry values of summation S(i−1), and generate sum and carry values for summation S(i), the significand circuit including a 2's complement, carry-save adder, to generate sum and carry accumulator output significand values of summation S(i); and
an exponent circuit receiving the multiplier exponent value of term A(i)*B(i) and a fed back exponent value of summation S(i−1), to generate an accumulator output exponent value for summation S(i).

17. The multiply-and-accumulate unit of claim 16, wherein:
the significand circuit of the accumulator stage includes a significand shifter, responsive to exponent comparison signals;
the exponent circuit is responsive to the exponent comparison signals; and
the pipeline includes exponent comparison circuits to compare the multiplier exponent value of term A(i)*B (i) to fed back exponent of summation S(i−1), to generate the exponent comparison signals used to generate summation S(i).

18. The multiply-and-accumulate unit of claim 17, wherein the accumulator stage includes:
an overflow detector circuit, to generate a first condition signal indicating an overflow condition for at least one of the fed back sum and carry values of summation S(i−1);
a leading sign bit detector circuit, to generate a second condition signal indicating that at least one of the fed back sum and carry values of summation S(i−1) has more than or equal to a number 8 of extended sign bits; and
the exponent circuit and significand circuit are also responsive to the first condition signal and the second condition signal.

19. An accumulate unit, comprising:
a pipeline configured to execute a accumulate operation for a sequence of input floating point operands, the pipeline including:
a significand circuit receiving in a pipeline cycle an input significand in a 2's complement format and fed back sum and carry values of a fed back accumulator output, the significand circuit including a 2's complement, carry-save adder, to generate sum and carry accumulator output significand values of an accumulator output; and an exponent circuit receiving in the pipeline cycle, an input exponent in radix-8 format and a fed back exponent value of the fed back accumulator output in the radix-8 format, to generate an accumulator output exponent value of the accumulator output.

20. The accumulate unit of claim 19, wherein:

the significand circuit includes a significand shifter, responsive to exponent comparison signals, to align the input significand and the fed back sum and carry values for addition;

the exponent circuit is responsive to the exponent comparison signals to generate the accumulator output exponent value; and the pipeline includes exponent comparison circuits to compare prior to the pipeline cycle the input exponent to the fed back exponent value to generate the exponent comparison signals.

21. The accumulate unit of claim 20, wherein the pipeline includes:

an overflow detector circuit, to generate an overflow signal indicating an overflow condition for at least one of the fed back sum and carry values; and the exponent circuit and significand circuit are also responsive to the overflow signal.

22. The accumulate unit of claim 20, wherein the pipeline includes:

an overflow detector circuit, to generate a first condition signal indicating an overflow condition for at least one of the fed back sum and carry values;

a leading sign bit detector circuit, to generate a second condition signal indicating that at least one of the fed back sum and carry values has more than or equal to a number 8 of extended sign bits; and the exponent circuit and significand circuit are also responsive to the first condition signal and the second condition signal.

\* \* \* \* \*